(12) United States Patent
Wong et al.

(10) Patent No.: US 11,626,133 B1
(45) Date of Patent: Apr. 11, 2023

(54) METHOD OF MANUFACTURING HEAD GIMBAL ASSEMBLY, HEAD GIMBAL ASSEMBLY AND HARD DISK DRIVE

(71) Applicant: SAE Magnetics (H.K.) Ltd., Hong Kong (HK)

(72) Inventors: Ka Yip Wong, Hong Kong (HK); Chi Hung Yuen, Hong Kong (HK); Ryo Hosoi, Hong Kong (HK); Seiichi Takayama, Hong Kong (HK)

(73) Assignee: SAE Magnetics (H.K.) Ltd., Hong Kong (HK)

( * ) Notice: Subject to any disclaimer, the term of this patent is extended or adjusted under 35 U.S.C. 154(b) by 0 days.

(21) Appl. No.: 17/709,402

(22) Filed: Mar. 30, 2022

(51) Int. Cl.
*G11B 5/48* (2006.01)
*G11B 5/00* (2006.01)

(52) U.S. Cl.
CPC .......... *G11B 5/4853* (2013.01); *G11B 5/4826* (2013.01); *G11B 5/4833* (2013.01); *G11B 2005/0021* (2013.01)

(58) Field of Classification Search
CPC ...... H05K 3/3442; H05K 3/244; H05K 1/189; H05K 2201/10727; H05K 2203/107; H05K 2203/041; H05K 3/3494; H01L 2224/742; Y02P 70/50; G11B 5/4833; G11B 5/4826; G11B 5/4853; G11B 5/486
See application file for complete search history.

(56) References Cited

U.S. PATENT DOCUMENTS

| | | | | |
|---|---|---|---|---|
| 5,610,783 A | * | 3/1997 | Maffitt | G11B 5/6005 |
| 5,680,275 A | * | 10/1997 | Frater | G11B 5/4826 |
| | | | | 360/234.5 |
| 5,692,669 A | * | 12/1997 | Sakemi | H05K 1/111 |
| | | | | 228/180.21 |
| 5,815,347 A | * | 9/1998 | Pattanaik | G11B 5/4853 |
| 5,821,494 A | * | 10/1998 | Albrecht | G11B 5/4853 |
| | | | | 228/111.5 |
| 5,889,636 A | * | 3/1999 | Arya | G11B 5/4833 |
| | | | | 360/234.5 |
| 5,949,618 A | * | 9/1999 | Arya | G11B 5/486 |
| 5,956,208 A | * | 9/1999 | Kawazoe | G11B 5/4853 |
| | | | | 360/234.5 |
| 6,330,132 B1 | * | 12/2001 | Honda | G11B 5/48 |
| | | | | 360/234.5 |

(Continued)

FOREIGN PATENT DOCUMENTS

| | | |
|---|---|---|
| JP | 200293092 A | 3/2002 |
| JP | 2004283911 A | 10/2004 |

(Continued)

*Primary Examiner* — Brian E Miller

(57) ABSTRACT

A method of manufacturing a head gimbal assembly includes a head connecting step which a thermally assisted magnetic head is connected to a suspension. The head connecting step includes a solder ball arrangement step which a solder ball is arranged so that a laser diode of the thermally assisted magnetic head is connected to a flexure of the suspension, in an assembly structure which a slider of the thermally assisted magnetic head is adhered to the suspension. The solder ball arrangement step is performed using a connecting ball, as the solder ball, having a size smaller than a wiring gap between an electrode surface of the laser diode and the flexure, and being in melted-particle condition.

8 Claims, 28 Drawing Sheets

(56) References Cited

U.S. PATENT DOCUMENTS

| | | | | |
|---|---|---|---|---|
| 7,567,410 B1* | 7/2009 | Zhang | G11B 5/4853 | 360/245.9 |
| 7,619,856 B2* | 11/2009 | Matsumoto | H05K 3/3442 | 360/234.6 |
| 8,248,892 B2 | 8/2012 | Shimazawa et al. | | |
| 8,279,560 B1* | 10/2012 | Pan | G11B 5/4846 | 360/244.1 |
| 8,320,084 B1* | 11/2012 | Shum | G11B 5/4833 | 360/245.9 |
| 8,587,901 B1* | 11/2013 | Puttichaem | G11B 5/486 | 360/234.5 |
| 9,368,138 B2 | 6/2016 | Inoue | G11B 5/4826 | |
| 9,390,737 B1 | 7/2016 | Puttichaem | G11B 5/486 | |
| 9,728,211 B1 | 8/2017 | Murata | G11B 5/4826 | |
| 10,460,754 B2* | 10/2019 | Matsumoto | G11B 5/4846 | |
| 10,614,841 B1 | 4/2020 | Hosoi | G11B 5/4826 | |
| 10,650,856 B1 | 5/2020 | Hosoi | G11B 13/04 | |
| 11,062,731 B1 | 7/2021 | Satoh | G11B 5/4826 | |
| 2002/0159196 A1* | 10/2002 | Watanabe | G11B 21/02 | |
| 2002/0179696 A1* | 12/2002 | Pattanaik | B23K 3/0623 | 228/41 |
| 2005/0190499 A1* | 9/2005 | Hernandez | G11B 5/4853 | 360/234.5 |
| 2005/0195527 A1* | 9/2005 | Yamaguchi | G11B 5/4826 | 29/603.01 |
| 2005/0195528 A1* | 9/2005 | Bennin | G11B 5/4846 | |
| 2006/0065642 A1* | 3/2006 | Shindo | H05K 3/3478 | 219/121.63 |
| 2006/0221501 A1* | 10/2006 | Sato | G11B 5/4853 | 360/234.5 |
| 2007/0012749 A1* | 1/2007 | Yamaguchi | H05K 3/3442 | 219/121.64 |
| 2007/0075056 A1* | 4/2007 | Ho | B23K 3/0623 | 219/121.66 |
| 2007/0279807 A1* | 12/2007 | Kobayashi | H05K 3/363 | 360/264.2 |
| 2008/0055763 A1* | 3/2008 | Tanaka | G11B 5/4826 | 360/59 |
| 2008/0179299 A1* | 7/2008 | Fukaya | B23K 3/0623 | 219/121.63 |
| 2009/0080111 A1* | 3/2009 | Yao | H05K 3/361 | 360/234.5 |
| 2009/0086374 A1* | 4/2009 | Smith | G11B 5/4826 | 360/234.5 |
| 2010/0097724 A1* | 4/2010 | Shimazawa | G11B 5/4833 | 360/245.4 |
| 2011/0016685 A1* | 1/2011 | Kawao | G11B 5/4826 | 29/402.03 |
| 2011/0205661 A1 | 8/2011 | Komura et al. | | |
| 2012/0044790 A1* | 2/2012 | Shimazawa | G11B 5/4853 | 369/13.32 |
| 2012/0155232 A1 | 6/2012 | Schreck et al. | | |
| 2013/0050877 A1* | 2/2013 | Chou | G11B 5/10 | 360/234.8 |
| 2013/0063839 A1* | 3/2013 | Matsumoto | G11B 5/4826 | 360/234.3 |
| 2013/0070369 A1* | 3/2013 | Chou | G11B 5/486 | 360/245.9 |
| 2013/0256281 A1* | 10/2013 | Tsuchiya | B23K 1/0056 | 219/121.64 |
| 2015/0154988 A1 | 6/2015 | Takei et al. | | |
| 2015/0364899 A1 | 12/2015 | Tatah et al. | | |
| 2015/0380035 A1 | 12/2015 | Takei et al. | | |
| 2016/0121416 A1* | 5/2016 | Murata | B23K 1/0016 | 228/248.1 |
| 2016/0184915 A1* | 6/2016 | Lo | B23K 1/0056 | 228/41 |
| 2016/0217814 A1* | 7/2016 | Chen | G11B 5/4813 | |
| 2016/0270216 A1* | 9/2016 | Fujimura | G11B 5/4846 | |
| 2016/0322072 A1* | 11/2016 | Puttichaem | G11B 5/4826 | |
| 2017/0229140 A1* | 8/2017 | Murata | G11B 5/4853 | |
| 2017/0372733 A1* | 12/2017 | McNeill | G11B 5/4853 | |
| 2019/0122694 A1* | 4/2019 | Davidson | G11B 5/3109 | |
| 2019/0147908 A1* | 5/2019 | Klarqvist | G11B 5/486 | 360/234.5 |
| 2019/0244636 A1* | 8/2019 | Matsumoto | G11B 5/4846 | |
| 2019/0295600 A1* | 9/2019 | Yoshikawa | G11B 5/4853 | |
| 2020/0098388 A1* | 3/2020 | Davidson | G11B 5/4826 | |
| 2022/0369473 A1* | 11/2022 | Fettke | H05K 3/3478 | |

FOREIGN PATENT DOCUMENTS

| | | |
|---|---|---|
| JP | 2006221690 A | 8/2006 |
| JP | 2007310968 A | 11/2007 |
| JP | 2012-084216 A | 4/2012 |

* cited by examiner (A)

(B)

(A)

(B)

(A)

(B)

METHOD OF MANUFACTURING HEAD GIMBAL ASSEMBLY, HEAD GIMBAL ASSEMBLY AND HARD DISK DRIVE

BACKGROUND

Field of the Invention

The present invention relates to a method of manufacturing a head gimbal assembly having a thermally assisted magnetic head recording data on a magnetic recording medium by thermally assisted magnetic recording using near-field light, the head gimbal assembly and a hard disk drive.

Related Background Art

In recent years, as magnetic disk drives have been increasing their recording densities, thin-film magnetic heads recording data on a magnetic recording media have been required to further improve their performances. As the thin-film magnetic heads, those of composite type having a structure in which a reproducing head having a magnetoresistive device (hereinafter, referred to also as an "MR device") for read and a recording head having an electromagnetic coil device for write are laminated have been conventionally in wide use. In a magnetic disk drive, the thin-film magnetic head is provided on a slider which very slightly floats from the magnetic recording medium.

Incidentally, the magnetic disk drive records data by magnetizing magnetic fine particles on the magnetic recording medium using the recording head. In order to increase the recording density of the magnetic recording medium, it is effective to make the magnetic fine particles smaller.

When the magnetic fine particles are made smaller, however, there arises a problem that the magnetization thereof becomes unstable with respect to heat as the particles reduce in volume, thereby increasing the possibility that the data recorded on the magnetic recording medium is lost. To solve the problem, it is effective to increase the magnetic energy of the magnetic fine particles to thereby enhance the stability of magnetization. When the magnetic energy of the magnetic fine particles is increased, however, there arises another problem that the coercive force (difficulty in reversing magnetization) of the magnetic recording medium increases to deteriorate the data recording performance.

To solve such problems, a method called thermally assisted magnetic recording has been conventionally proposed. When recording data on a magnetic recording medium having a large coercive force, the thin-film magnetic head employing the thermally assisted magnetic recording (hereinafter, referred to as a "thermally assisted magnetic head") records data while instantaneously heating and thereby increasing the temperature of a portion of the magnetic recording medium where data will be recorded.

Since the magnetic fine particles decrease in coercive force when the temperature is increased, instantaneous heating makes it possible to record data even on the magnetic recording medium having a high coercive force at room temperature. The portion of the magnetic recording medium where the data has been recorded is decreased in temperature after the recording of data and thereby increases in coercive force. Therefore, by using the thermally assisted magnetic head, it becomes possible to make the magnetic fine particles finer as well as stabilize recording in the magnetic disk drive.

On the other hand, near-field light is used as means for heating the magnetic recording medium in the conventional thermally assisted magnetic head. When light enters an opening smaller than the wavelength of light, the light slightly seeps from the opening and locally exists near the opening. The light locally existing near the opening is called near-field light. The near-field light is confined in a region much smaller than that of a spot light obtained by collecting light using a lens, so that use of the near-field light makes it possible to heat only a limited extremely small recording region of the magnetic recording medium. A conventional technology concerning the thermally assisted magnetic recording is disclosed in, for example, US 2012-0155232 (also called patent document 1).

By the way, in the thermally assisted magnetic head, because the recording head is formed on the slider, the structure, which laser light for generating the near-field light is guided to the medium-opposing surface of the slider, is important. The following structure is conventionally known as the structure.

The structure which the light source is provided on the surface of the slider (for example, US2015-0364899 (also called patent document 2), US2011-0205661 (also called patent document 3), US2015-154988 (also called patent document 4), US 2015-0380035 (also called patent document 5), JP2012-084216 (also called patent document 6)).

Concerning the above-described structure, the slider is mounted on a part which is called suspension, thereby a part, including the slider and the suspension, which is called head gimbal assembly (hereinafter, also referred to as "HGA") is manufactured. The magnetic disk drive is fabricated with the HGA.

SUMMARY OF THE INVENTION

There is a following problem in the conventional head gimbal assembly including the above-described thermally assisted magnetic head. Solder is used in the process of manufacturing the HGA, thereby the problem is caused.

When a laser diode as the light source is provided on the surface of the slider, a member which is called sub-mount is used. For example, the sub-mount 300, as illustrated in FIG. 27, is used.

At this time, a laser diode 310 is joined on a surface 300a of the sub-mount 300 to form a light source-unit 360. After that, the sub-mount 300 is joined on a surface 401 of a slider 400.

Then, as illustrated in FIG. 28, when the slider 400 is mounted on a suspension 500, a HGA 700 is manufactured with them, a terminal pad 410 of the slider 400 is electrically connected to the suspension 500. Further, because an electrode 311 is formed on a surface of the laser diode 310, the electrode 311 is also electrically connected to the suspension 500. The terminal pad 410 of the slider 400, the electrode 311 of the laser diode 310 are conventionally connected with solder (respectively solders 600, 610).

Concerning the conventionally HGA, the structure, which electrodes of the slider and laser diode are connected to the suspension with solder, like the HGA 700, for example, is disclosed in JP2004-283911 (also called patent document 7), JP2007-310968 (also called patent document 8), JP2002-93092 (also called patent document 9), JP2006-221690 (also called patent document 10), USP 8,248,892 (also called patent document 11) and so on.

However, when the HGA 700 is manufactured, the solder 600 needs to be connected to both the slider 400 and the suspension 500. The solder 610 also needs to be connected both the laser diode 310 and the suspension 500. Furthermore, because the solders 600, 610 are connected in melting condition, they have surface tension. Therefore, stress (tensile stress), in accordance with surface tension of the solders 600, 610, is caused in the parts which the solders 600, 610 (electrode pads 500a, 500b of the suspension 500, an electrode pad 410 of the slider 400, the electrode 311 of the laser diode 310) touch.

Then, after the solders 600, 610 hardened, the stress remains in connection parts 601, 602, 611, 612 as mechanical stress. The mechanical stress makes the connection condition of the solders 600, 610 unstable. Therefore, it is difficult that stability of the connection condition is improved in the conventional HGA.

Especially, the conventional HGA, including the thermally assisted magnetic head, like the HGA 700, includes many connected parts with solder, because of including the laser diode 310, thereby mechanical stress is likely to remain.

Besides, the conventional HGA, like the HGA 700, the solders 600, 610 are widely connected to the whole of the electrode pads 500a, 500b and the electrode pad 410. Therefore, parts, which are affected by surface tension, widely exist, thereby stress, originated in surface tension, is likely to be enlarged, mechanical stress is likely to be enlarged. Therefore, in the conventional HGA, like the HGA 700, it is extremely difficult that stability of the connection condition is improved.

Hence the present invention is made to solve the above problem, and it is an object to provide a method of manufacturing the head gimbal assembly, which is able to improve the connection condition, in the head gimbal assembly being manufactured with solder, a head gimbal assembly and hard disk drive which is manufactured according to the method of manufacturing.

To solve the above problem, the present invention is a method of manufacturing a head gimbal assembly having a thermally assisted magnetic head and a suspension including: a head connecting step which the thermally assisted magnetic head is connected to the suspension; the thermally assisted magnetic head includes a structure which a light-source unit, having a laser diode, is joined to a slider in which an electromagnetic element is formed; the suspension includes an opening part which penetrates from a slider arrangement surface, which the slider is arranged, to a light-source unit surface, which the light-source unit is arranged, and a flexure which forms the slider arrangement surface; the head connecting step includes a solder ball arrangement step which a solder ball is arranged so that the laser diode is connected to the flexure, in an assembly structure which the light-source unit is inserted into the opening part from the slider arrangement surface of the suspension and the light-source unit is protruded from the light-source unit surface and the slider is adhered to the slider arrangement surface of the suspension; the solder ball arrangement step is performed using a connecting ball, as the solder ball, having a size smaller than a wiring gap between an electrode surface of the laser diode and the flexure, and being in melted-particle condition.

In case of the above-described method of manufacturing a head gimbal assembly, it is possible that the solder ball arrangement step includes a first arrangement step and a second arrangement step; the first arrangement step is performed so that the connecting ball is attached to only either one of the electrode surface of the laser diode and the flexure; the second arrangement step is performed so that the connecting ball is attached to only the other of the electrode surface of the laser diode and the flexure.

Further, in the above-described method of manufacturing a head gimbal assembly, it is possible that the solder ball arrangement step further includes a third arrangement step which a third connecting ball is arranged; the third connecting ball is different from a first connecting ball, arranged in the first arrangement step and a second connecting ball, arranged in the second arrangement step; the third connecting ball is performed so that the third connecting ball is attached to both the first connecting ball and the second connecting ball.

Furthermore, the present provides a method of manufacturing a head gimbal assembly having a thermally assisted magnetic head and a suspension including: a head connecting step which the thermally assisted magnetic head is connected to the suspension; the thermally assisted magnetic head includes a structure which a light-source unit, having a laser diode, is joined to a slider in which an electromagnetic element is formed; the suspension includes an opening part which penetrates from a slider arrangement surface, which the slider is arranged, to a light-source unit surface, which the light-source unit is arranged, and a flexure which forms the slider arrangement surface; the head connecting step includes a solder ball arrangement step which only one solder ball is arranged so that the laser diode is connected to the flexure, in an assembly structure which the light-source unit is inserted into the opening part from the slider arrangement surface of the suspension and the light-source unit is protruded from the light-source unit surface and the slider is adhered to the slider arrangement surface of the suspension; the solder ball arrangement step is performed using a connecting ball, as the solder ball, having a size slightly larger than a wiring gap between an electrode surface of the laser diode and a wiring end part, of the flexure, closest to the electrode surface and being in melted-particle condition.

In the above-described method of manufacturing a head gimbal assembly, it is possible that the solder ball arrangement step is performed so that the connecting ball is away from the flexure in a first arrangement distance larger than the particle size of the connecting ball, when the connecting ball is arranged so as to be attached to the electrode surface in either one of the first arrangement step and the second arrangement step.

Further, it is possible that the solder ball arrangement step is performed so that the connecting ball is away from the electrode surface in a second arrangement distance larger than the particle size of the connecting ball, when the connecting ball is arranged so as to be attached to the flexure in either one of the first arrangement step and the second arrangement step.

Furthermore, it is possible that a solder connector forming step which the first connecting ball and the second connecting ball merge together to form a solder connector after the solder ball arrangement step is performed; the solder connector forming step is performed so that the solder connector includes a neck part.

Further, it is possible that a solder connector forming step which the first connecting ball, the second connecting ball and the third connecting ball merge together to form a solder connector after the solder ball arrangement step is performed; the solder connector forming step is performed so that the solder connector includes two neck parts.

Further, it is possible that the suspension includes a load beam which forms the light-source unit surface; the flexure includes a wiring member which forms the slider arrangement surface; the wiring member includes an exposed wiring surface which is exposed in the opening part; the solder ball arrangement step is performed so that the connecting ball is attached to the exposed wiring surface, in the first arrangement step or the second arrangement step.

Further, it is possible that the suspension includes a load beam which forms the light-source unit surface; the flexure includes a wiring member which forms the slider arrangement surface; the wiring member includes an exposed wiring surface which is exposed in the opening part; the solder ball arrangement step is performed so that the connecting ball is attached to both the wiring end part and the exposed wiring surface.

Then, the present invention provides a head gimbal assembly having a thermally assisted magnetic head and a suspension including: a structure which a light-source unit, having a laser diode, is joined to a slider in which an electromagnetic element is formed; the suspension includes an opening part which penetrates from a slider arrangement surface, which the slider is arranged, to a light-source unit surface, which the light-source unit is arranged, and a flexure which forms the slider arrangement surface; the head gimbal assembly includes an assembly structure which the light-source unit is inserted into the opening part from the slider arrangement surface of the suspension and the light-source unit is protruded from the light-source unit surface and the slider is adhered to the slider arrangement surface of the suspension, and a solder connector being formed so that the laser diode is connected to the flexure; the solder connector includes a neck structure which a neck part is formed on a slant part, being formed in a descent slanting shape from the electrode surface of the laser diode to the flexure; the neck part is a part which the width, along with the direction intersecting the length direction from the electrode surface to the wiring member, is gradually narrowed.

In the above-described head gimbal assembly, it is possible that the suspension includes a load beam including the light-source unit surface; the flexure includes a wiring member which forms the slider arrangement surface; the wiring member includes an exposed wiring surface which is exposed in the opening part; the solder connector is connected to the exposed wiring surface of the wiring member.

Then, the present invention provides a head gimbal assembly having a thermally assisted magnetic head and a suspension including: a structure which a light-source unit, having a laser diode, is joined to a slider in which an electromagnetic element is formed; the suspension includes an opening part which penetrates from a slider arrangement surface, which the slider is arranged, to a light-source unit surface, which the light-source unit is arranged, and a flexure which forms the slider arrangement surface; the head gimbal assembly includes an assembly structure which the light-source unit is inserted into the opening part from the slider arrangement surface of the suspension and the light-source unit is protruded from the light-source unit surface and the slider is adhered to the slider arrangement surface of the suspension, and a solder connector being formed so that the laser diode is connected to the flexure; the solder connector includes a slant part which is formed in a descent slanting shape from the electrode surface of the laser diode to the flexure, and an extending part which extends from a wiring end part, of the flexure, being closest to the electrode surface.

Further, the present invention provides a hard disk drive including a head gimbal assembly and a magnetic recording medium, the head gimbal assembly includes a thermally assisted magnetic head and a suspension; the thermally assisted magnetic head includes a structure which a light-source unit, having a laser diode, is joined to a slider in which an electromagnetic element is formed; the suspension includes an opening part which penetrates from a slider arrangement surface, which the slider is arranged, to a light-source unit surface, which the light-source unit is arranged, and a flexure which forms the slider arrangement surface; the head gimbal assembly includes an assembly structure which the light-source unit is inserted into the opening part from the slider arrangement surface of the suspension and the light-source unit is protruded from the light-source unit surface and the slider is adhered to the slider arrangement surface of the suspension, and a solder connector being formed so that the laser diode is connected to the flexure; the solder connector includes a neck structure which a neck part is formed on a slant part, being formed in a descent slanting shape from the electrode surface of the laser diode to the flexure; the neck part is a part which the width, along with the direction intersecting the length direction from the electrode surface to the wiring member, is gradually narrowed.

Further, the present invention provides a hard disk drive including a head gimbal assembly and a magnetic recording medium, the head gimbal assembly includes a thermally assisted magnetic head and a suspension; the thermally assisted magnetic head includes a structure which a light-source unit, having a laser diode, is joined to a slider in which an electromagnetic element is formed; the suspension includes an opening part which penetrates from a slider arrangement surface, which the slider is arranged, to a light-source unit surface, which the light-source unit is arranged, and a flexure which forms the slider arrangement surface; the head gimbal assembly includes an assembly structure which the light-source unit is inserted into the opening part from the slider arrangement surface of the suspension and the light-source unit is protruded from the light-source unit surface and the slider is adhered to the slider arrangement surface of the suspension, and a solder connector being formed so that the laser diode is connected to the flexure; the solder connector includes a slant part which is formed in a descent slanting shape from the electrode surface of the laser diode to the flexure, and an extending part which extends from a wiring end part, of the flexure, being closest to the electrode surface.

The present invention will be more fully understood from the detailed description given hereinbelow and the accompanying drawings which are given by way of illustration only, and thus are not to be considered as limiting the present invention.

DETAILED DESCRIPTION OF THE EMBODIMENTS

In the following, embodiments of the present invention will be described with reference to the drawings. Note that the same components will be referred to with the same numerals or letters, while omitting their overlapping descriptions.

First Embodiment (Structure of a Head Gimbal Assembly)

Figure 1:
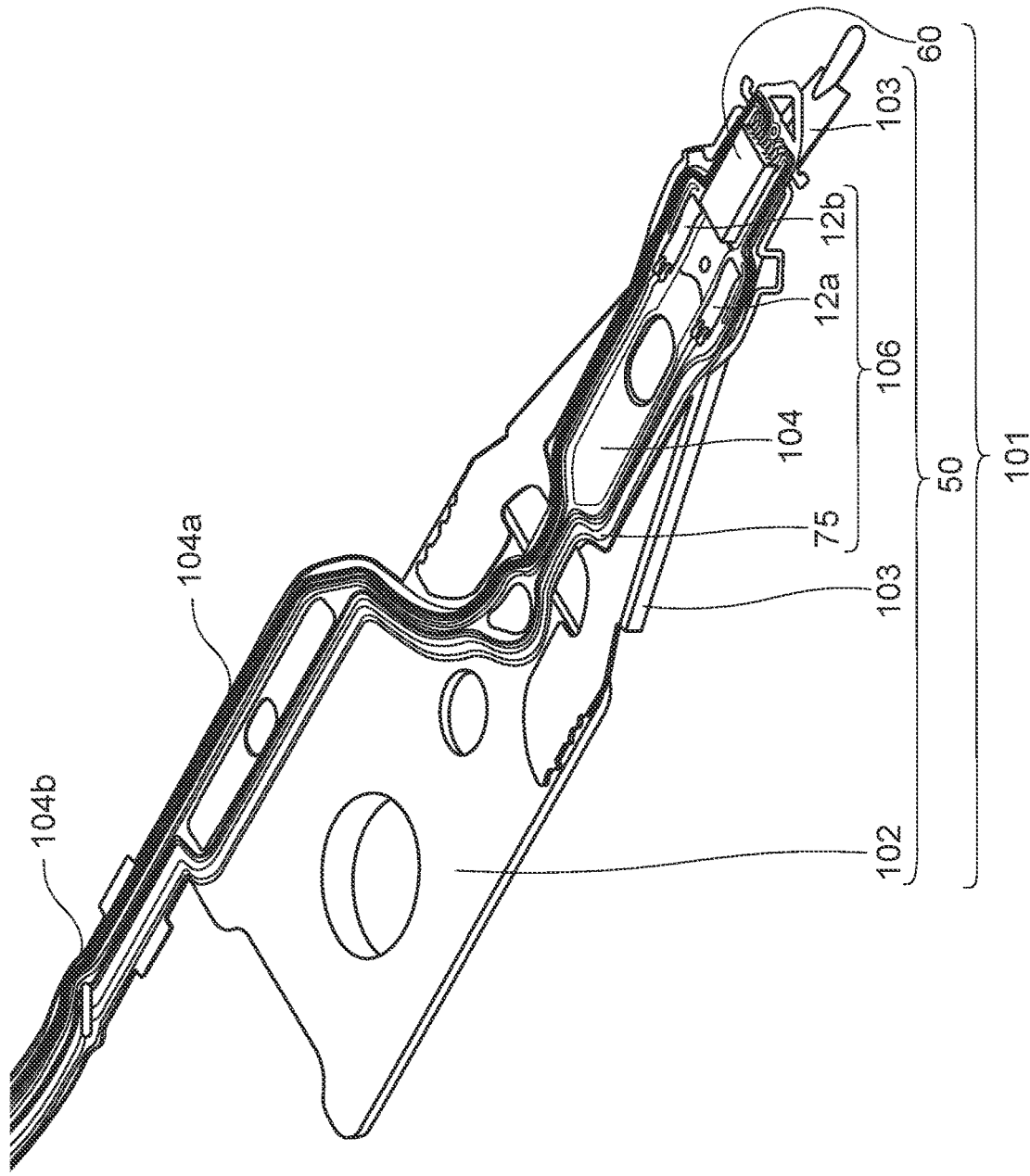
FIG. 1 is a perspective view of a whole HGA, seen from front side, which is manufactured by a method of manufacturing according to a first embodiment of the present invention.
Figure 2:
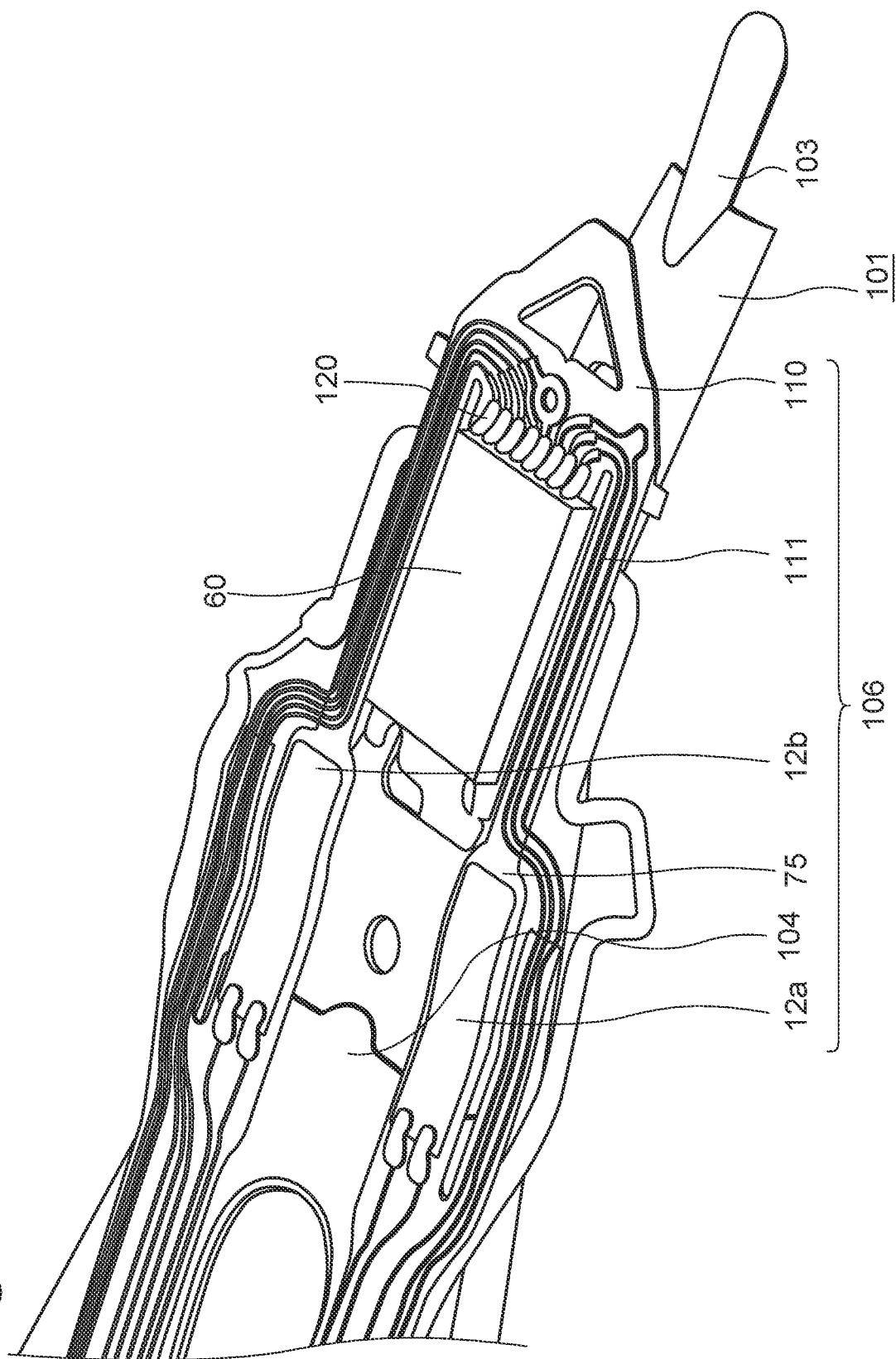
FIG. 2 is a perspective view, seen from the front side, of a principal part of the HGA, in FIG. 1.
Figure 3:
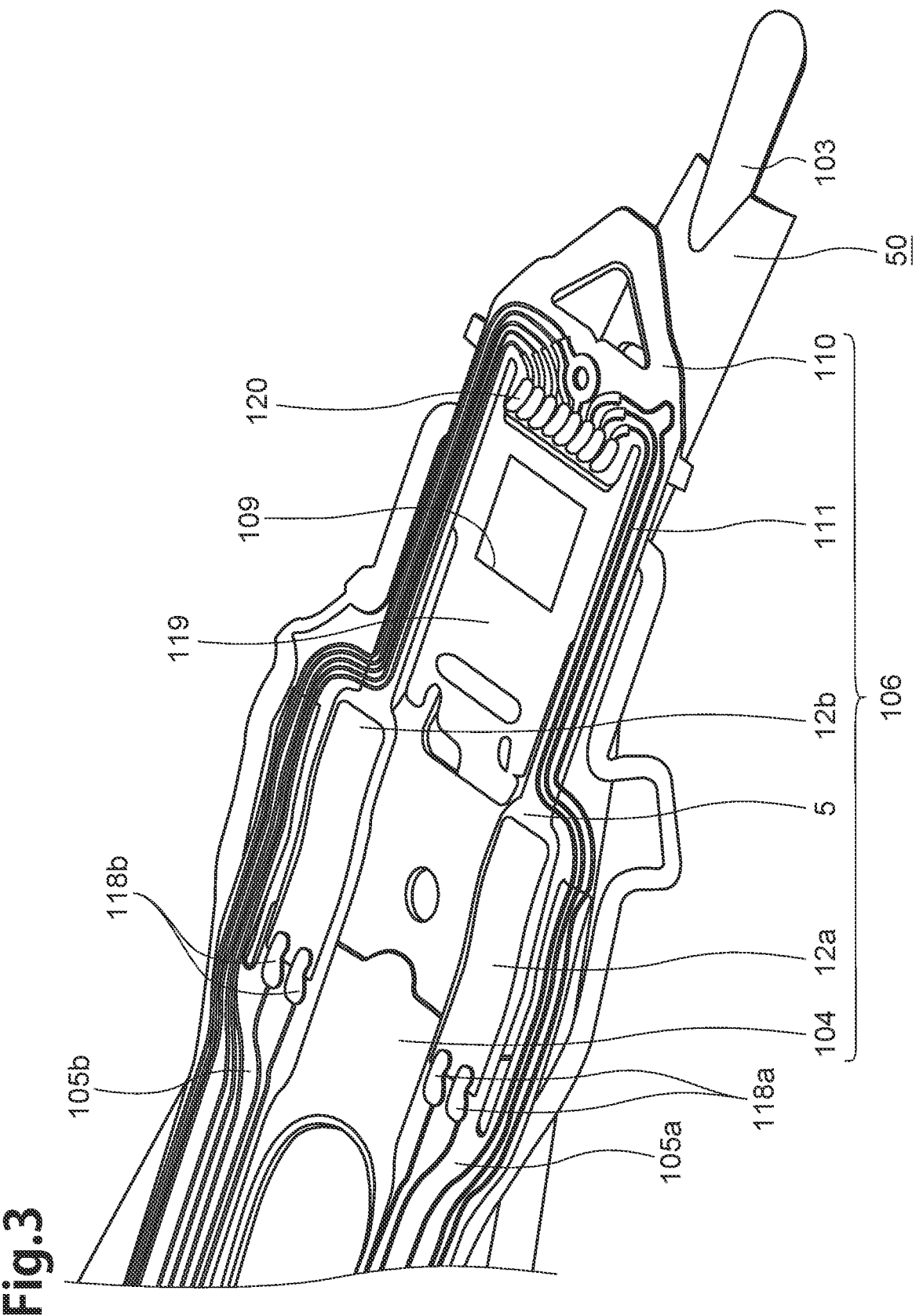
FIG. 3 is a perspective view, seen from the front side, of the principal part of the suspension constituting the HGA, in FIG. 1.
Figure 4:
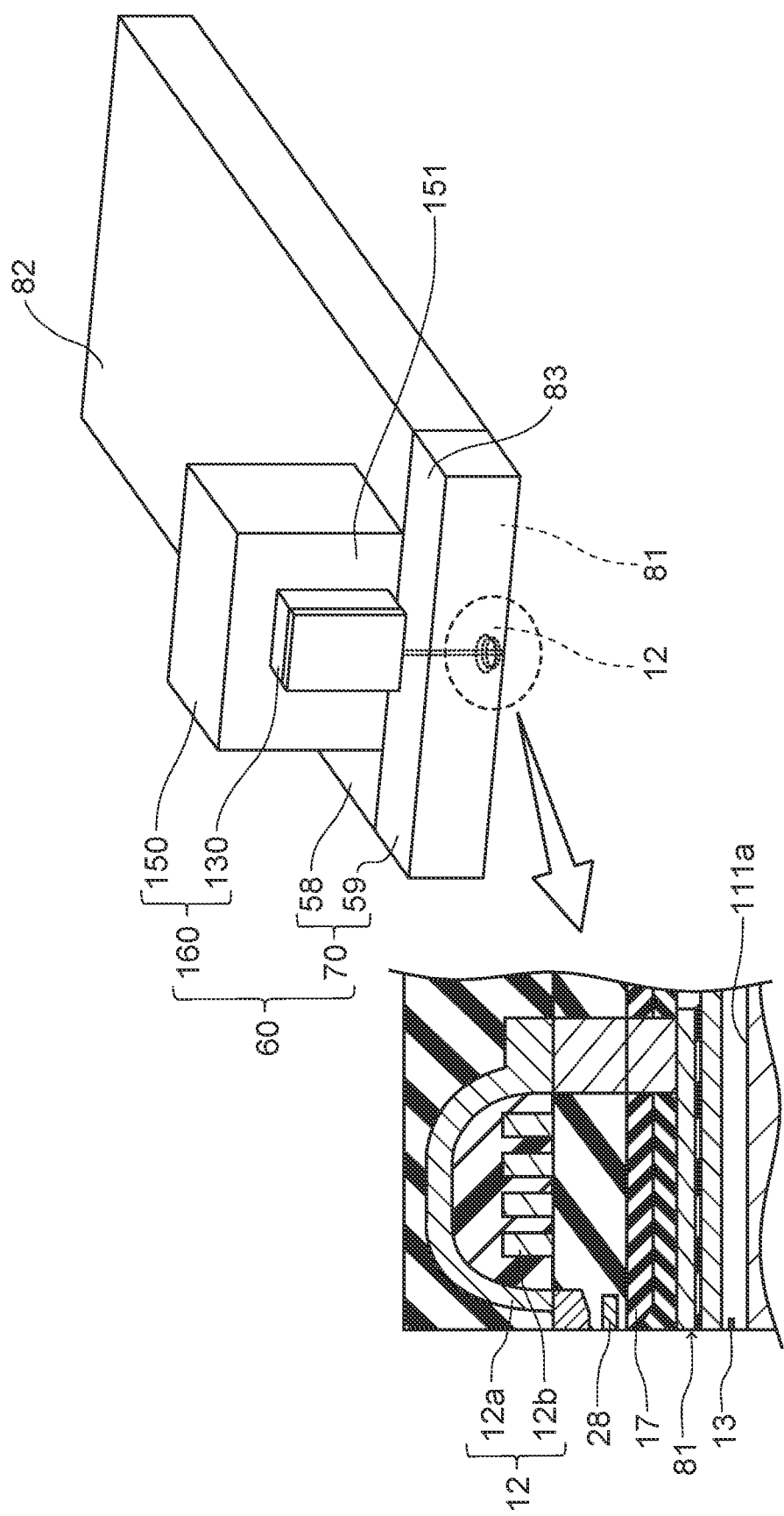
FIG. 4 is a perspective view of the thermally assisted magnetic head constituting the HGA, in FIG. 1.
Figure 5:
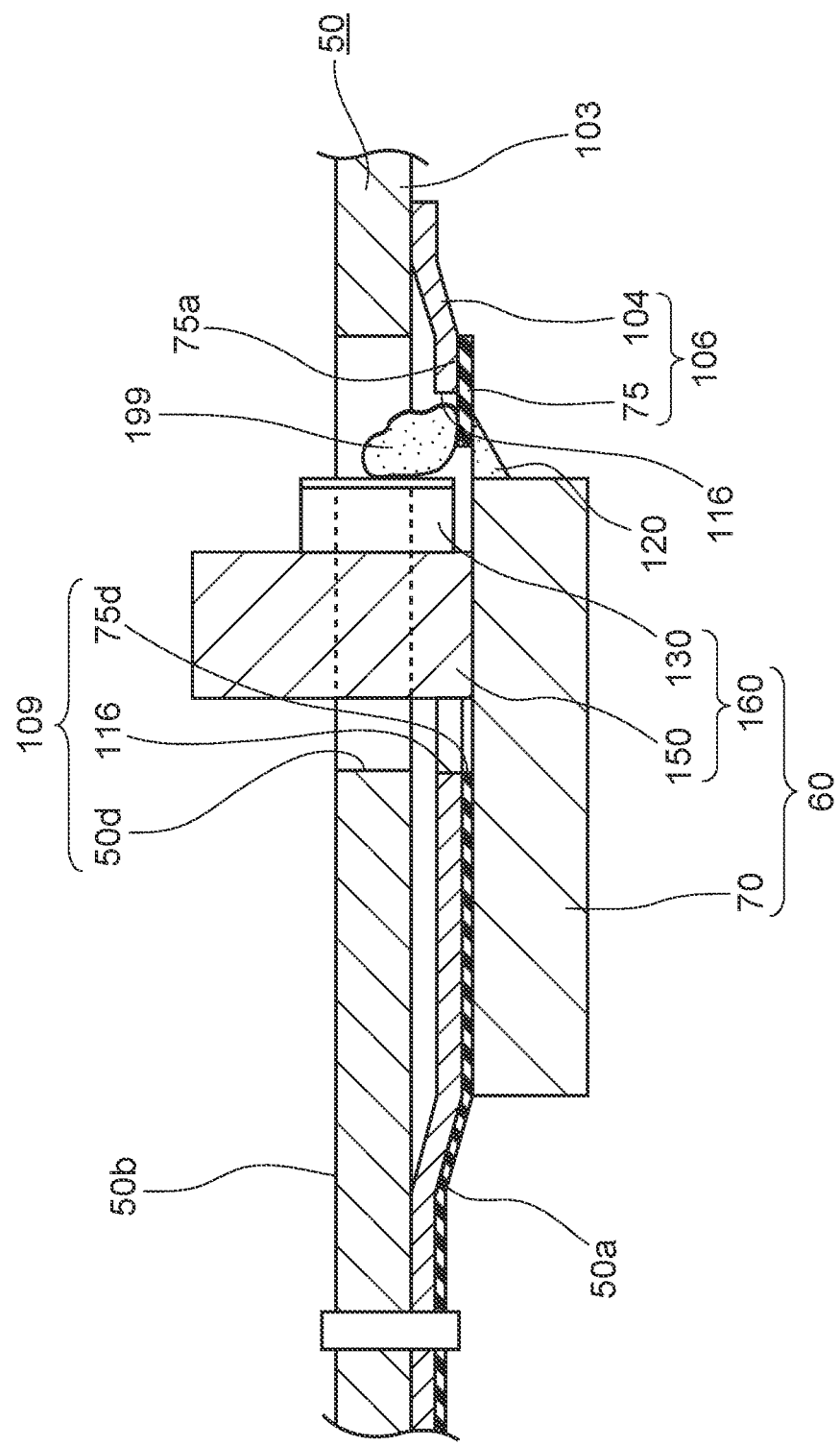
FIG. 5 is a sectional view of a principal part, of the HGA in FIG. 1, which is along with the length direction.
Figure 6:
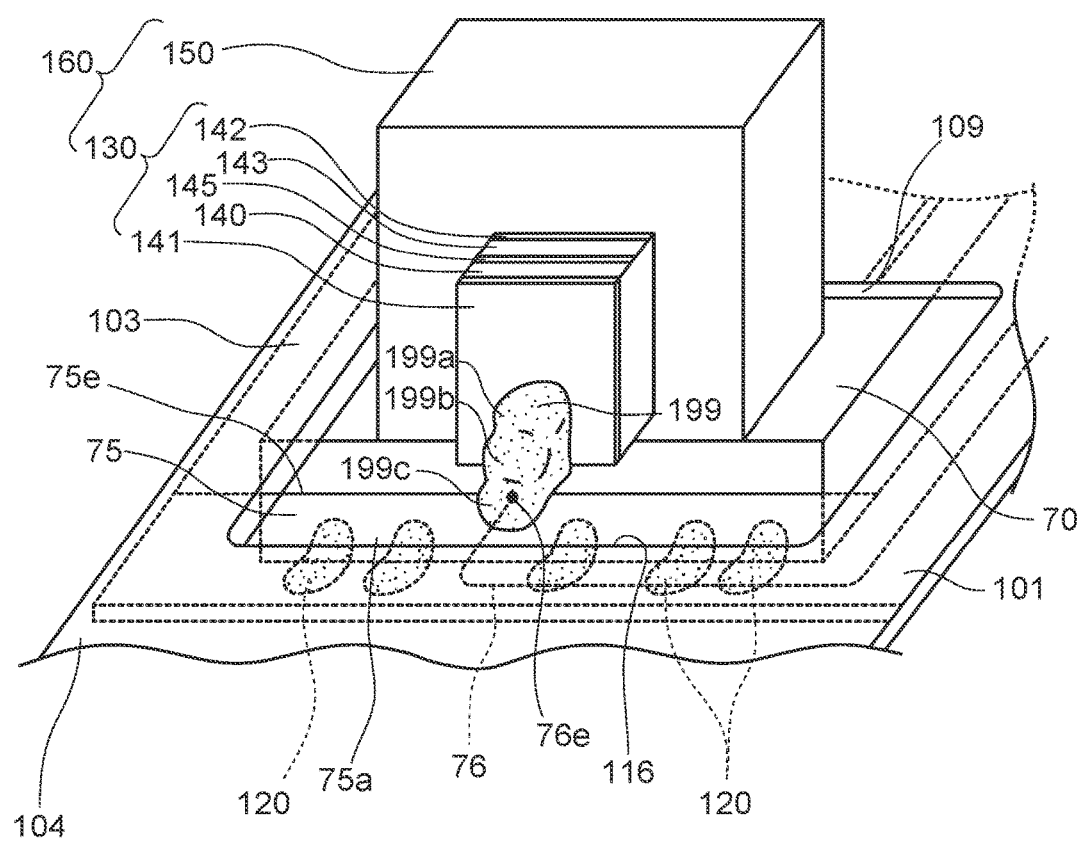
FIG. 6 is a perspective view, seen from rear side, showing the principal part of the HGA in FIG. 1.
Figure 7:
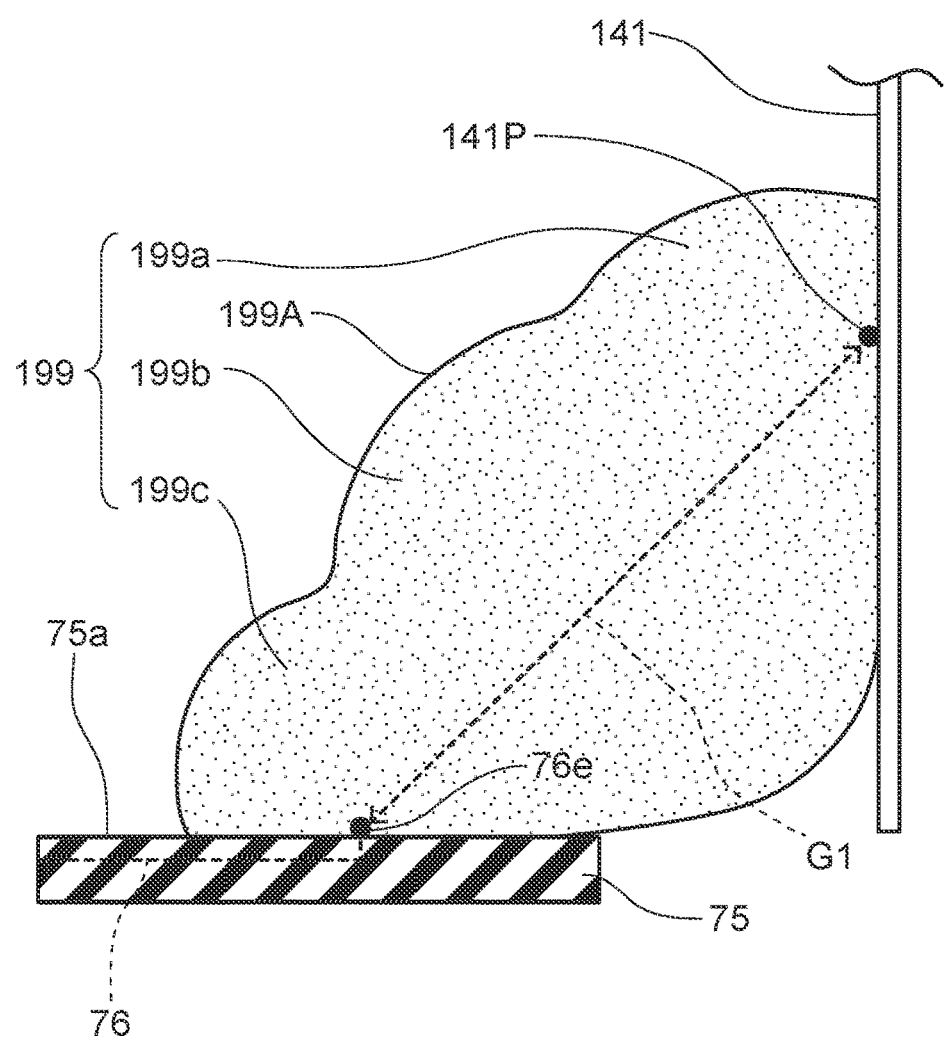
FIG. 7 is a side view showing a solder connecter which is included in the HGA in FIG. 1 and peripheral members.
Figure 8:
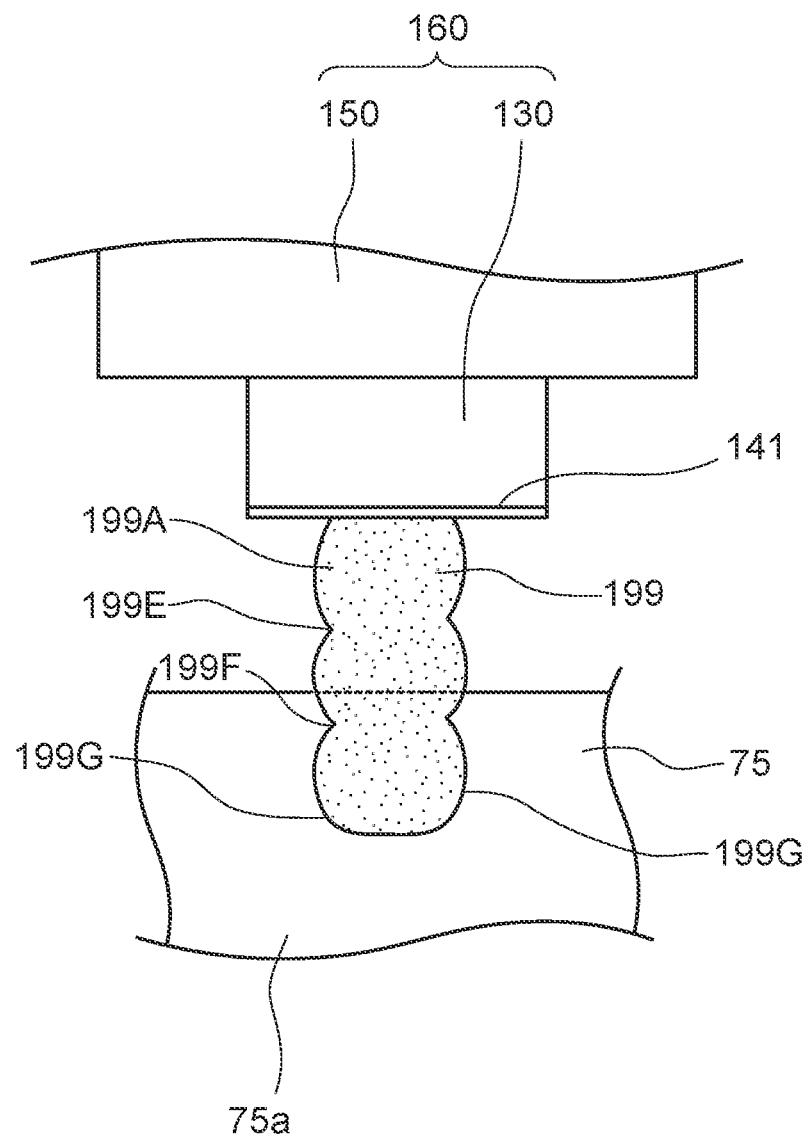
FIG. 8 is a plan view showing a solder connecter which is included in the HGA in FIG. 1 and peripheral members.

To begin with, structure of a Head Gimbal Assembly 101 which is manufactured with the method of manufacturing according to the first embodiment of the present invention will be explained with reference to FIG. 1 to FIG. 8. Here, FIG. 1 to FIG. 8 are views showing the HGA 101, which is manufactured with the method of manufacturing according to the first embodiment of the present invention, FIG. 1 is a perspective view of the whole HGA 101, seen from the front side, FIG. 2 is a perspective view, seen from the front side, of a principal part of the HGA 101, FIG. 3 is a perspective view, seen from the front side, of a principal part of a suspension 50 constituting the HGA 101. Further, FIG. 4 is a perspective view of a thermally assisted magnetic head 60 constituting the HGA 101, FIG. 5 is a sectional view of a principal part, of the HGA 101, which is along with the length direction, FIG. 6 is a perspective view showing the principal part of the HGA 101. Further, FIG. 7 is a side view showing a solder connecter 199 which is included in the HGA 101 and peripheral members, FIG. 8 is a plan view showing the solder connecter 199 and peripheral members.

As illustrated in FIG. 1, the HGA 101 has the suspension 50 and the thermally assisted magnetic head 60. The suspension 50 has a base plate 102, a load beam 103, a flexure 106 and a dumper not illustrated, and it has a structure which these parts are joined to be united one body by a weld and so on.

The base plate 102 is a part which is used to fix the suspension 50 to drive arms 209 of a later-described hard disk drive 201, and it is formed with a metal such as stainless steel or the like.

The load beam 103 is fixed on the base plate 102. The load beam 103 has a shape in which the width gradually decreases as it is distanced more from the base plate 102. The load beam 103 has a load bending part which generates a power for pressing the thermally assisted magnetic head 60 against the hard disk 202 of the hard disk drive 201.

Further, as illustrated in FIG. 2, the flexure 106 has a flexure substrate 104, a wiring member 75, a connecting wiring 111 and thin-film piezoelectric material elements 12*a*, 12*b*. The flexure 106 has a structure which the wiring member 75 is formed on the flexure substrate 104, the connecting wiring 111 and thin-film piezoelectric material elements 12*a*, 12*b* are adhered on the wiring member 75. Further, a not-illustrated protective insulating layer is formed so as to cover the connecting wiring 111 and thin-film piezoelectric material elements 12*a*, 12*b*.

The flexure 106 has piezoelectric elements attached structure which thin-film piezoelectric material elements 12*a*, 12*b* are fixed on the surface of the wiring member 75 in addition to the connecting wiring 111 to become a structure with piezoelectric element.

Further, the flexure 106 has a gimbal part 110 on the tip side (load beam 103 side). A tongue part 119, which the thermally assisted magnetic head 60 is mounted, is secured on the gimbal part 110 (see FIG. 3), and a plurality of connecting pads 120 are formed near an edge side than the tongue part 119. Connecting pads 120 are electrically connected to not-illustrated electrode pads of the thermally assisted magnetic head 60, and the connecting pads 120 are formed with solder.

This flexure 106 expands or shrinks thin-film piezoelectric material elements 12a, 12b and expands or shrinks stainless part (referred to out trigger part) jut out outside of the tongue part 119. That makes a position of the thermally assisted magnetic head 60 move very slightly around not-illustrated dimple, and a position of the thermally assisted magnetic head 60 is controlled minutely.

The flexure substrate 104 is a substrate for supporting a whole of the flexure 106, and it is formed with stainless. Rear side of the flexure substrate 104 is fixed to the base plate 102 and the load beam 103 by weld (see FIG. 3, concerning the load beam 103). As illustrated in FIG. 1, the flexure substrate 104 has a center part 104a fixed to surfaces of the load beam 103 and the base plate 102, and a wiring part 104b extending to outside from the base plate 102.

As illustrated in FIG. 5, the wiring member 75 covers surface of the flexure substrate 104. The wiring member 75 forms a later-described slider arrangement surface 50a, of the HGA 101, according to this invention. The wiring member 75 is formed with for example polyimide, and it has a thickness of about 5 μm to 10 μm. Further, as illustrated in detail in FIG. 3, a part of the wiring member 75, disposed on the load beam 103, is divided two parts. One part of them is a first wiring part 105a, the other part of them is a second wiring part 105b. The thin-film piezoelectric material elements 12a and thin-film piezoelectric material element 12b are adhered on surfaces of each wiring part. The thin-film piezoelectric material element 12a, 12b are connected to the electrode pads 118a, 118b. The electrode pads 118a, 118b are connected to the connecting wiring 111.

Further, as illustrated in FIG. 5, FIG. 6, the wiring member 75 has an exposed wiring surface 75a which is exposed inside a later-described opening part 109. A connecting pad 76e of an electrode wiring 76, included in the connecting wiring 111, is provided on the exposed wiring surface 75a. A later-described solder connector 199 is connected to the connecting pad 76e. Further a plurality of connecting pads 120 are formed on the slider arrangement surface 50a of the wiring member 75. The connecting pads 120 are connected to the connecting wiring 111.

As illustrated in FIG. 3, a plurality of connecting wirings 111 are formed on surfaces of each of the first wiring part 105a and the second wiring part 105b. Each connecting wiring 111 is formed with conductor such as copper or the like. One end parts of each connecting wiring 111 are connected to the electrode pads 118a, 118b or each connecting pad 20. The electrode wiring 76 of the connecting wiring 111 is connected to the solder connector 199.

Then, illustrated in FIG. 5, the suspension 50 includes the slider arrangement surface 50a and a light-source unit surface 50b. The slider arrangement surface 50a is a surface of the side which a later-described slider 70, of the thermally assisted magnetic head 60, is arranged. The slider arrangement surface 50a is formed with an outside surface of the above-described wiring member 75. The slider 70 is adhered on the slider arrangement surface 50a.

Further, the suspension 50 includes the opening part 109. The opening part 109 is a hole part which penetrates from the slider arrangement surface 50a to the light-source unit surface 50b, and it is formed by overlapping of an opening part 75d, an opening part 116, opening part 50d. The opening part 75d, the opening part 116, the opening part 50d are respectively the opening part of the wiring member 75, the opening part of the flexure substrate 104, the opening part of the load beam 103 (note that the load beam 103 is omitted in FIG. 6, for convenience of illustration).

Then, the HGA 101 includes an assembly structure. As illustrated in FIG. 5, FIG. 6, the assembly structure is a structure which is constituted by the suspension 50 and the thermally assisted magnetic head 60.

As later described in detail, the thermally assisted magnetic head 60 includes the slider 70 and the light-source unit 160. In the HGA 101, concerning the suspension 50 and the thermally assisted magnetic head 60, the light-source unit 160 is inserted in the opening part 109 from the slider arrangement surface 50a and the light-source unit 160 is protruded from the light-source unit surface 50b. Moreover, the slider 70 is adhered on the slider arrangement surface 50a of the suspension 50. The structure, which is constituted by the suspension 50 and the thermally assisted magnetic head 60, is the assembly structure.

Further, the HGA 101 includes the solder connector 199. The solder connector 199 is explained in detail as follows.

(Solder connector)

As illustrated in FIG. 5 to FIG. 7, the solder connector 199 is connected to a n-electrode 141 of the later-described laser diode 130 and the connecting pad 76e of the electrode wiring 76. The connecting pad 76e is provided on the exposed wiring surface 75a, and the n-electrode 141 is arranged so as to face the connecting pad 76e. The n-electrode 141 is connected to the connecting pad 76e with the solder connector 199.

The solder connector 199 includes a double-neck structure. As illustrated in FIG. 6 to FIG. 8, in detail, the double-neck structure means a structure which two neck parts 199E, 199F are formed on a slant part 199A like the solder connector 199. The structure, which a neck part (later-described, in detail) is formed on the slant part, is a neck structure though, the structure, which the neck parts are formed doubly, is the double-neck structure.

As illustrated in FIG. 7, FIG. 8, the slant part 199A is an outside surface of the solder connector 199, and it corresponds to a part formed in slanting shape (in case of FIG. 6, a descent slanting shape) from the surface of the n-electrode 141 (corresponds to an electrode surface in this invention) to the wiring member 75. The two neck parts 199E, 199F are formed in the slant part 199A.

As illustrated in FIG. 8, the respective neck parts 199E, 199F are parts which the widths, along with the direction intersecting the length direction (direction from the surface of the n-electrode 141 to the wiring member 75 along with the slant part 199A) are gradually narrowed. There are two edge lines 199G in both sides of the slant part 199A, the respective edge lines 199G include three circular arc parts. The parts, which the respective circular arc parts are connected, corresponds to the neck-parts 199E, 199F.

Further, as illustrated in FIG. 7, the solder connector 199 includes three parts of an upper part 199a, a middle part 199b, a lower part 199c, which are connected at the neck-parts 199E, 199F.

Then, because the HGA 101 is manufactured in accordance with the method of manufacturing according to the first embodiment of the present invention, the solder connector 199 includes the double-neck structure. The method of manufacturing is explained later.

(Structure of the thermally assisted magnetic head)

As illustrated in FIG. 4, the thermally assisted magnetic head 60 has a slider 70 and a light source-unit 160. The thermally assisted magnetic head 60 has a structure which the light source-unit 160 is joined to the slider 70.

The slider 70 has a slider-substrate 58 and a magnetic head part 59 formed on the slider-substrate 58.

The slider-substrate 58 is made of a ceramic material such as aluminum oxide-titanium carbide ($Al_2O_3 \cdot TiC$) or the like, and it is formed in a rectangular parallelepiped shape. The slider-substrate 58 has a medium opposing surface (Air Bearing Surface, which will hereinafter be referred also to as "ABS") 81 opposing to the magnetic recording medium, a light source placing surface 82, arranged in the rear side of the ABS 81. A part, of the light source placing surface 82, near the magnetic head part 59, is a light source-opposing surface 83. The light source-opposing surface 83 opposes to a later-described laser diode 130 of the light source-unit 160.

The magnetic head part 59 has an electromagnetic coil element 12 which is a recording head for recording magnetic data and a MR device 13 which is a reproducing head for detecting a magnetic signal. The magnetic head part 59 has a structure which the reproducing head and the recording head are stacked. Further, the magnetic head part 59 has a core layer 17 and a near-field light generating layer 28.

The MR device 13 is constituted by a magnetosensitive film exhibiting a magnetoresistive effect, such as AMR (anisotropic magnetoresistive), GMR (giant magnetoresistive), and TMR (tunneling magnetoresistive) devices.

The electromagnetic coil element 12 has a plurality of layers, which is laminated on a thin-film laminated surface 111a, including a recording magnetic layer 12a and a thin-film coil 12b. The thin-film coil 12b is wound like a flat spiral about the recording magnetic layer 12a.

Then, in the electromagnetic coil element 12, when a current, modulated according to magnetic data to be recorded on the magnetic recording medium, flows through the thin-film coil 12b, the current causes the thin-film coil 12b to generate a recording magnetic field. Further, magnetic flux, in accordance with magnetic field, is emitted from the recording magnetic layer 12a to the magnetic recording medium, the magnetic flux flows back to a not-illustrated return magnetic pole layer via the magnetic recording medium (a not-illustrated soft magnetic layer in detail).

The core layer 17 is a wave guide which guides laser light, generated by the later-described laser diode 130 of the light source-unit 160, from the light source-opposing surface 83 to the ABS 81.

The core layer 17 is formed with dielectric such as tantalum oxide ($TaO_x$) or the like. For example, the core layer 17 is able to be formed with $Ta_2O_5$ (for example, the refractive index is about 2.16).

The near-field light generating layer 28 generates near-field light for heating the magnetic recording medium. The near-field light generating layer 28 is made of metal and formed of, for example, one of Au, Ag, Al, Cu, Pd, Pt, Rh, Ir or an alloy made of a plurality of those elements.

(Light source-unit)

The light source-unit 160 has the laser diode 130 and a sub-mount 150. The laser diode 130 is joined to the sub-mount 150 to constitute the light source-unit 160.

As illustrated in FIG. 6, the laser diode 130 has an n-substrate 140, an n-electrode 141, a light emitting layer 145, and a p-electrode 142, and has a rectangle parallelepiped shape. The n-electrode 141 is joined to a surface on the outside of the n-substrate 140. Further, the light emitting layer 145 is formed on a side of the n-substrate 140 opposite to the n-electrode 141, and the p-electrode 142 is joined on the light emitting layer 145, via a ground layer 143.

The light emitting layer 145 has an active layer, an n-cladding layer, and a p-cladding layer, and has a structure in which the active layer is sandwiched between the n-cladding layer and the p-cladding layer.

Then, the laser diode 130 is joined to the sub-mount 150 so that the active layer opposes to the core layer 17, and a not-illustrated emitting part is arranged in a part, of the light emitting layer 145, opposing to the core layer 17. The emitting part is a part, of the laser diode 130, which emits the laser light.

The sub-mount 150 is made of a ceramic material such as aluminum oxide-titanium carbide ($Al_2O_3 \cdot TiC$) or the like, and it is formed in a rectangular parallelepiped shape. The sub-mount 150 has a size larger than the laser diode 130. Further, the sub-mount 150 is able to be formed with semiconductor material such as Si, GaAs, SiC or the like.

As illustrated in FIG. 4, the sub-mount 150 of the light source-unit 160, having the above-described structure, is joined to the slider 70 to constitute the thermally assisted magnetic head 60.

(Method of manufacturing the Head Gimbal Assembly)

Figure 9:
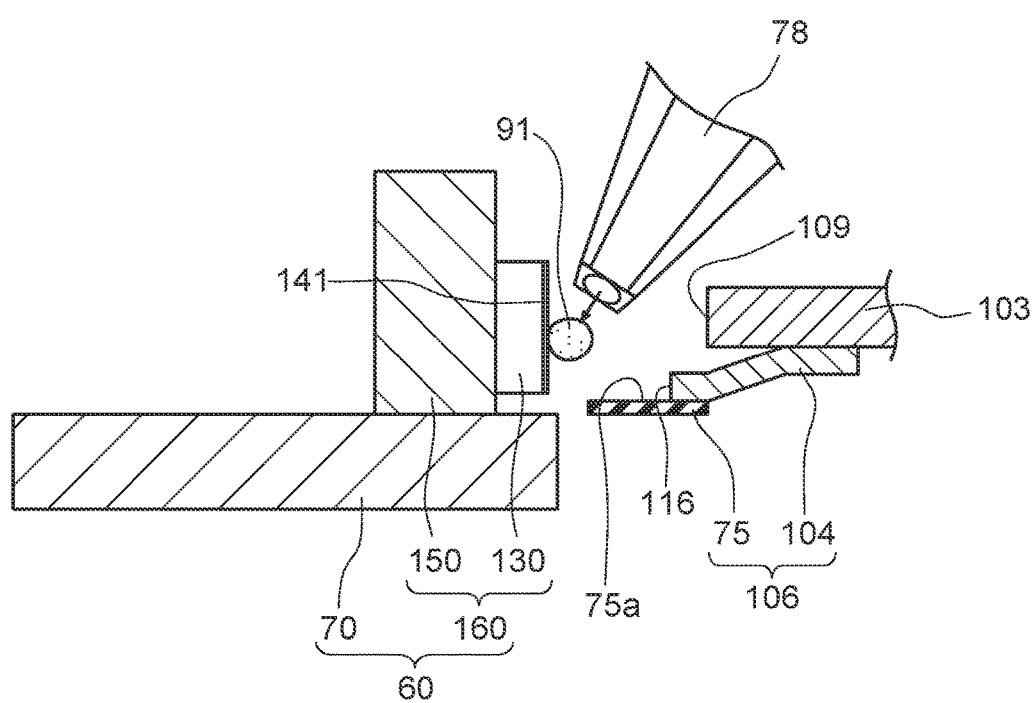
FIG. 9 is a sectional view showing a solder ball arrangement step of the method of manufacturing according to the first embodiment of the present invention.
Figure 10:
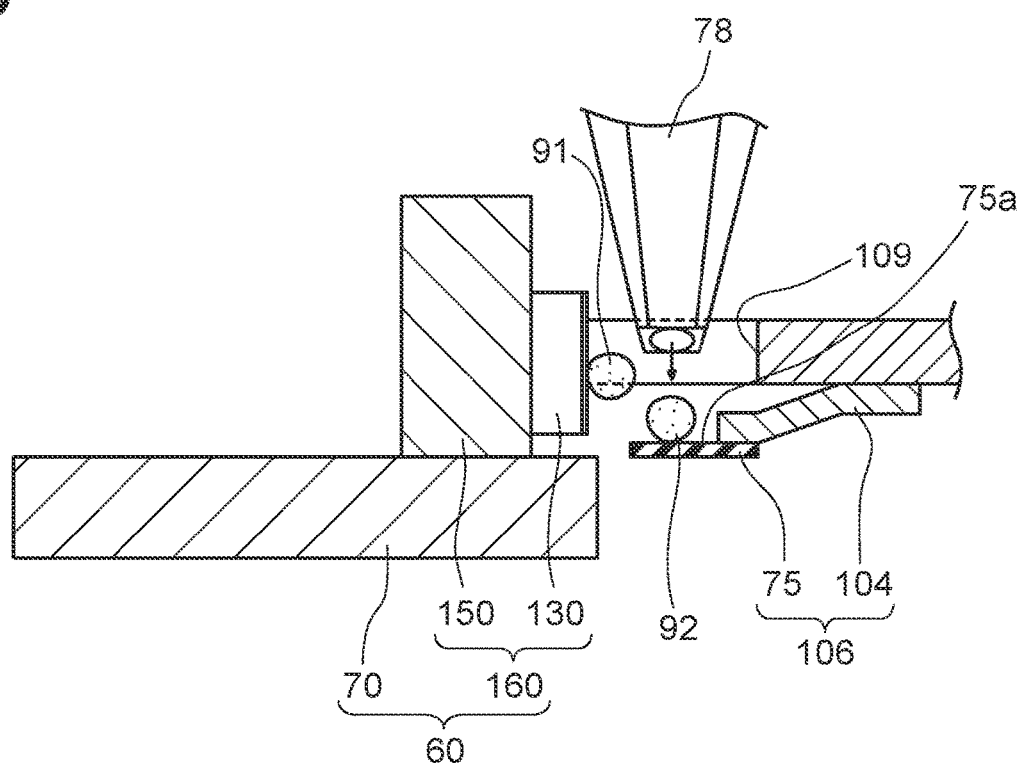
FIG. 10 is a sectional view showing a step subsequent to that in FIG. 9.
Figure 11:
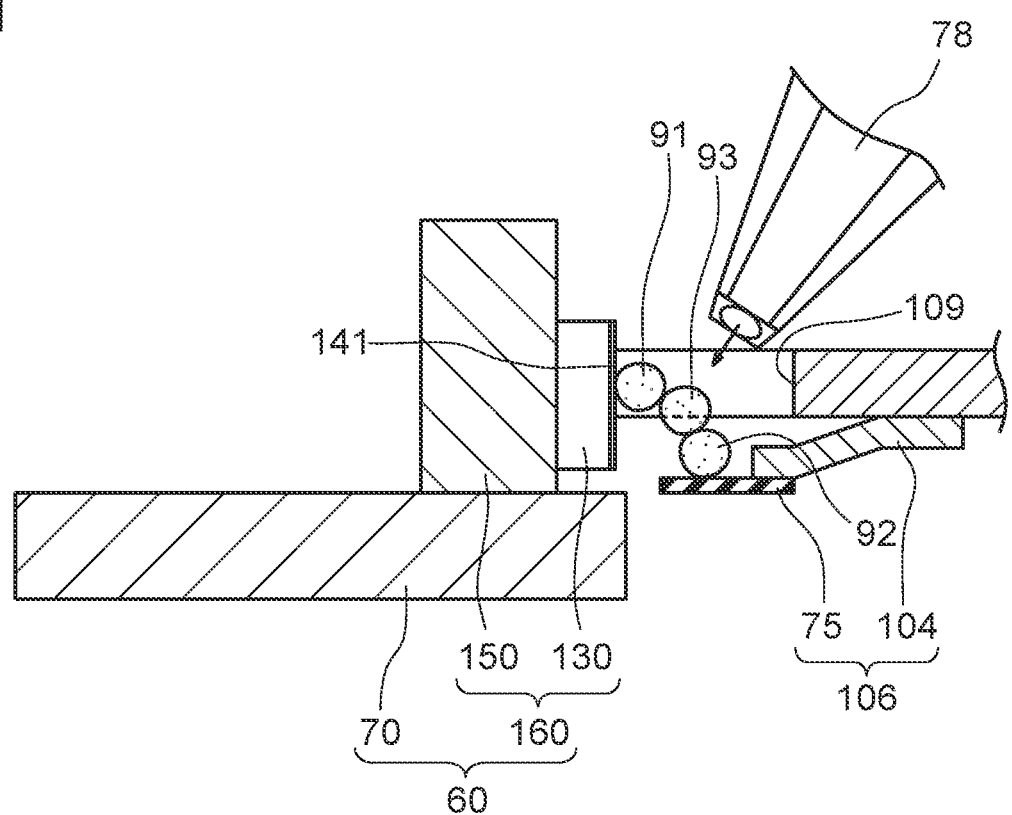
FIG. 11 is a sectional view showing a step subsequent to that in FIG. 10.
Figure 12:
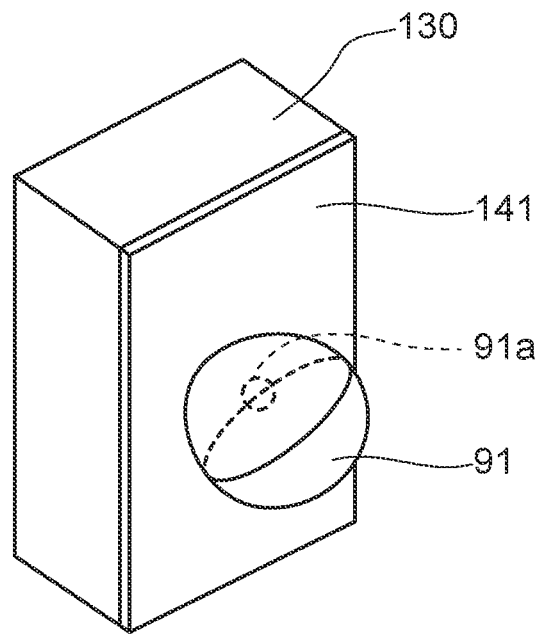
FIG. 12(A) is a perspective view showing the laser diode and a first connecting ball, which constitutes the HGA in FIG. 1.
FIG. 12(B) is a side view showing the laser diode and the first connecting ball, which constitutes the HGA in FIG. 1.
Figure 12:
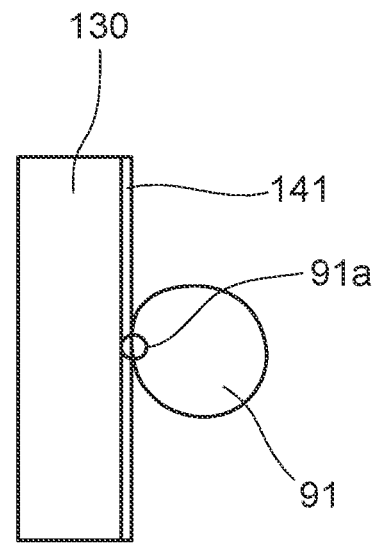
Figure 13:
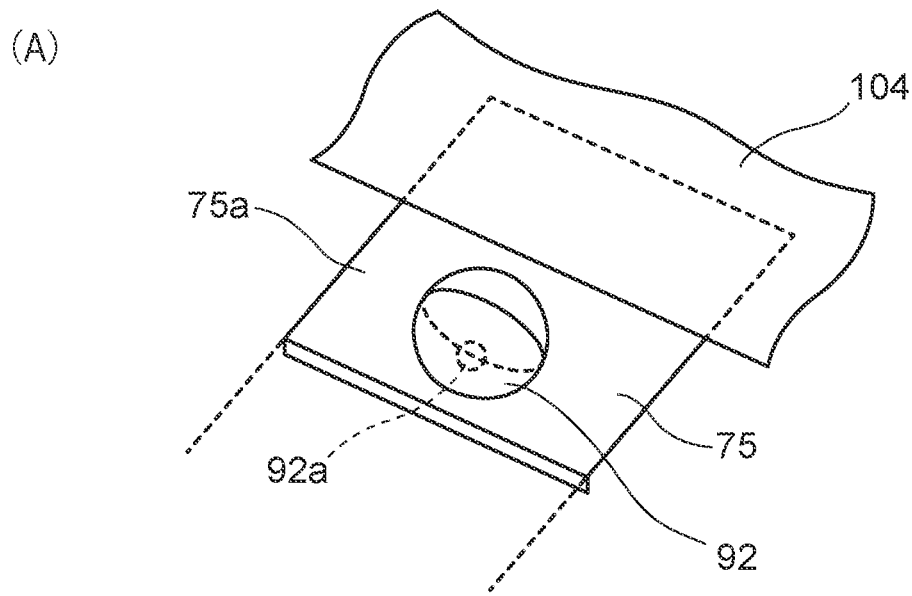
FIG. 13(A) is a perspective view showing a wiring member, a flexure substrate and a second connecting ball which constitutes the HGA in FIG. 1.
FIG. 13(B) is a perspective view showing the wiring member and the second connecting ball, which constitutes the HGA in FIG. 1.
Figure 13:
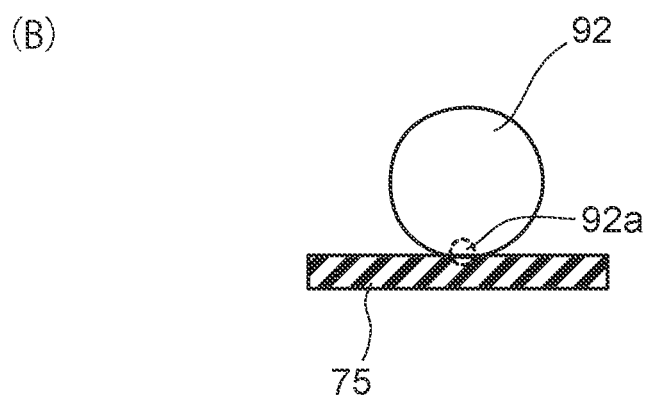
Figure 14:
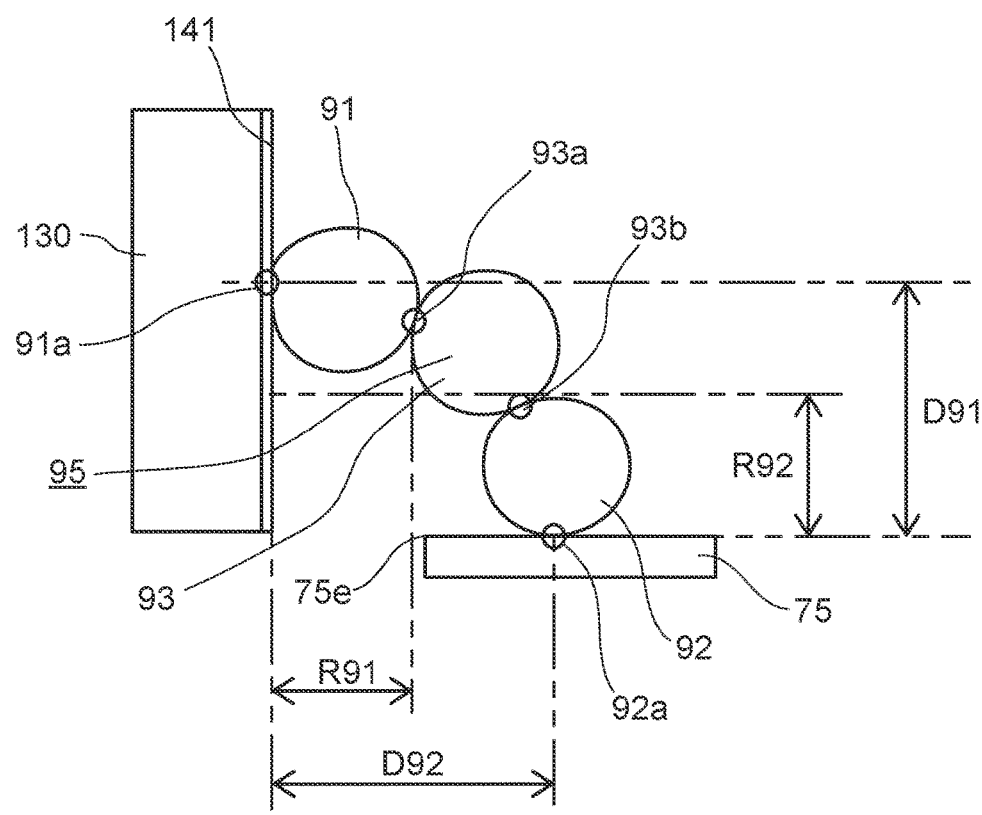
FIG. 14 is a side view showing the laser diode, the wiring member and the first, second, third connecting balls which constitute the HGA in FIG. 1.

Subsequently, the method of manufacturing the HGA 101, according to the first embodiment of the present invention will be explained with reference to FIG. 9 to FIG. 14. FIG. 9 to FIG. 11 are sectional views showing a solder ball arrangement step of the method of manufacturing according to the first embodiment of the present invention. FIG. 12(A) is a perspective view showing the laser diode 130 and a first connecting ball 91, FIG. 12(B) is a side view showing the laser diode 130 and the first connecting ball 91. FIG. 13(A) is a perspective view showing the wiring member 75, the flexure substrate 104 and the second connecting ball 92, FIG. 13(B) is a perspective view showing the wiring member 75 and the second connecting ball 92. FIG. 14 is a side view showing the laser diode 130, the wiring member 75 and the first, second, third connecting balls 91, 92, 93.

The method of manufacturing, according to the present invention, includes a head connecting step. In the head connecting step, the above-described thermally assisted magnetic head 60 is connected to the suspension 50. A solder ball arrangement step is included in the head connecting step. The method of manufacturing, according to the present invention, is characterized by the solder ball arrangement step.

Then, in the solder ball arrangement step, a solder ball (or solder balls) is/are arranged so that the laser diode 130 is connected to the flexure 106 for the above-described assembly structure. In the method of manufacturing according to the first embodiment of the present invention, first, second, third arrangement steps are included in the solder ball arrangement step. In the first, second, third arrangement steps, first, second, third connecting balls 91, 92, 93 are used as the solder balls. Because three connecting balls 91, 92, 93 are used, in the method of manufacturing according to first embodiment, the method of manufacturing according to first embodiment is also called "3-ball method".

The respective connecting balls 91, 92, 93 are solder balls, having the approximate same size, they have sizes smaller than a wiring gap G1 (see FIG. 7), and they are in melted-particle condition. In the present invention, melted-particle condition means condition which melted solder becomes a particle-shaped by the surface tension. The solder ball is a minute granule like member, made of solder, and it has a ball like form. As illustrated in FIG. 7, the wiring gap G1 is the distance between an electrode surface of the laser diode 130 (n-electrode 141) and the flexure 106 (wiring member 75). As illustrated in FIG. 7, it is possible that the distance, between a connecting point 141P and the connecting pad 76e, is the wiring gap G1. Note that the connecting point 141P is a part, of the n-electrode 141, which the solder connector 199 is connected.

Subsequently, with reference to FIG. 9, FIG. 10, FIG. 11, the solder ball arrangement step will be explained in detail. In the method of manufacturing according to the first embodiment, at first, the first arrangement step is performed in the solder ball arrangement step.

As illustrated in FIG. 9, the first connecting ball 91 is arranged, in the first arrangement step. In detail, the first connecting ball 91 is jetted from a capillary 78, and the first connecting ball 91 is attached to the n-electrode 141. The first connecting ball 91 has the size smaller than the wiring gap G1, and it is in melted-particle condition. Therefore, when the first connecting ball 91 is jetted from the capillary 78 toward the n-electrode 141, as illustrated in FIG. 9, the first connecting ball 91 is attached only in the n-electrode 141. The size of the first connecting ball 91 is set in the size smaller than the wiring gap G1 so that the first connecting ball 91 is not attached both the n-electrode 141 and the wiring member 75 when the first connecting ball 91 is arranged.

Subsequently, the second arrangement step is performed, thereby the second connecting ball 92 is arranged. As illustrated in FIG. 10, in the second arrangement step, the second connecting ball 92 is jetted from the capillary 78, and the second connecting ball 92 is attached to the exposed wiring surface 75a of the wiring member 75. The second connecting ball 92 also has the size smaller than the wiring gap G1, and it is in melted-particle condition. Therefore, when the second connecting ball 92 is jetted from the capillary 78 toward the exposed wiring surface 75a, as illustrated in FIG. 10, the second connecting ball 92 is attached only in the exposed wiring surface 75a.

Next, the third arrangement step is performed, thereby the third connecting ball 93 is arranged. As illustrated in FIG. 11, in the third arrangement step, another third connecting ball 93 with the first, second connecting balls 91, 92 is jetted from the capillary 78, and the third connecting ball 93 is attached to both the first connecting ball 91 and the second connecting ball 92.

Then, in the above-described method of manufacturing, after the first, second, third arrangement step is performed, a solder connector forming step is performed. In the solder connector forming step, two neck parts, namely, the neck parts 199E, 199F are formed.

All the first, second, third connecting balls 91, 92, 93 are in melted-particle condition. Therefore, as illustrated in FIG. 14, the third connecting ball 93 is attached to both the first connecting ball 91 and the second connecting ball 92, thereby a solder member 95, united into one body, is formed. After that, merging of the solder member 95 proceed though, when the first, second, third connecting balls 91, 92, 93 harden, a formation of the solder member 95 is fixed. However, the first, second, third connecting balls 91, 92, 93 (solder member 95) hang down downward (toward the exposed wiring surface 75a) while merging, because of their weight, until the first, second, third connecting balls 91, 92, 93 harden. As a result, the solder connector 199, having the above-described form, is formed. In this case, a temperature-control is performed so that the temperature of the assembly structure becomes an appropriate temperature. When the temperature is too low, merging of the first, second, third connecting balls 91, 92, 93 (solder member 95) becomes harder to proceed. Further, when the temperature is too high, merging of the first, second, third connecting balls 91, 92, 93 (solder member 95) proceeds to much, the desired form is not able to be obtained. Therefore, in the solder connector forming step, the temperature-control is performed so that the solder connector 199 is formed.

In this way, the first, second, third connecting balls 91, 92, 93 are united into one body, after that, the first, second, third connecting balls 91, 92, 93 harden, thereby the solder connector 199 is formed. Thereby, the solder connector 199 has the above-described double neck structure.

On the other hand, in the first arrangement step, the first connecting ball 91 is arranged so that the following first attaching condition is satisfied.

First attaching condition: as illustrated in FIG. 14, the first connecting ball 91 is attached to the n-electrode 141 so that the first connecting ball 91 is away from the flexure 106 (wiring member 75) in a first arrangement distance D91, and the whole of the first connecting ball 91 is away from the flexure 106 (wiring member 75) in the distance, larger than the particle size of the second connecting ball 92 (R92)

However, the first arrangement distance D91 is larger than the particle size of the second connecting ball 92 (R92) (D91>R92).

Further, in the second arrangement step, the second connecting ball 92 is arranged so that the following second attaching condition is satisfied.

Second attaching condition: the second connecting ball 92 is attached to the flexure 106 (wiring member 75) so that the second connecting ball 92 is away from the n-electrode 141 in a second arrangement distance D92, and the whole of the second connecting ball 92 is away from the n-electrode 141 in the distance, larger than the particle size of the first connecting ball 91 (R91)

However, the second arrangement distance D92 is larger than the particle size of the first connecting ball 91 (R91) (D92>R91).

Operation and Effect of the Head Gimbal Assembly 101

As described above, the HGA 101 has the solder connector 199, the solder connector 199 connects the n-electrode 141 and the wiring member 75.

Then, the solder connector 199 is formed when the HGA 101 is manufactured in accordance with the method of manufacturing according to the first embodiment of the present invention. The method of manufacturing includes the solder ball arrangement step, in the solder ball arrangement step, the above-described first, second, third arrangement steps are performed.

In the first, second arrangement steps, the first, second connecting balls 91, 92 are arranged so that the first, second connecting balls 91, 92 are respectively attached only in the n-electrode 141, the exposed wiring surface 75*a*. The first, second connecting balls 91, 92 have globular forms. Therefore, as illustrated in FIGS. 12, 13, attaching points 91*a*, 92*a*, of the first, second connecting balls 91, 92, which are extremely narrow, are attached only in the n-electrode 141, the exposed wiring surface 75*a*.

The first, second connecting balls 91, 92 have surface tension, because of being in melted-particle condition. Therefore, the first, second connecting balls 91, 92 try to make surface area as small as possible, so the first, second connecting balls 91, 92 try to pull the n-electrode 141, the exposed wiring surface 75*a* when the first, second connecting balls 91, 92 are in contact with the n-electrode 141, the exposed wiring surface 75*a*. Therefore, stress, which try to against the surface tension, occurs in the n-electrode 141, the exposed wiring surface 75*a*, after the first, second connecting balls 91, 92 harden, the stress remain in the connected parts of the first, second connecting balls 91, 92 and the n-electrode 141, the exposed wiring surface 75*a*, as mechanical stress.

At this point, in the conventional technology, because solder is attached to the whole of the electrode pads, when solder is attached, solder is attached to comparatively wide parts. Therefore, parts, being affected from surface tension, exist widely, thereby large mechanical stress remains in the HGA. Therefore, it is difficult that the stability of the connection condition is improved in the conventional HGA.

To the contrary, in the HGA 101, as described-above, the first, second connecting balls 91, 92 are in melted-particle condition though, attaching points 91*a*, 92*a*, which are extremely narrow, are in contact with only the n-electrode 141, the exposed wiring surface 75*a*. Namely, the contacting parts of the first, second connecting balls 91, 92, in melted-particle condition, are limited to the attaching points 91*a*, 92*a*, which are extremely narrow. Therefore, the rages, being affected by surface tension of the first, second connecting balls 91, 92, are limited to the extremely narrow area, until the first, second connecting balls 91, 92 harden. Therefore, mechanical stress is extremely lowered, accordingly, it is possible that the stability of the connection condition is improved in the HGA 101. Especially, mechanical stress, of the n-electrode 141, the exposed wiring surface 75*a*, being affected by surface tension of the first, second connecting balls 91, 92, becomes small, thereby a failure such as peel-off or lift-up of the electrode 141, the exposed wiring surface 75*a* is prevented.

Further, for prevention of connection failure, caused by contamination of the n-electrode 141, the exposed wiring surface 75*a*, it is necessary for the first, second connecting balls 91, 92 to be attached powerfully. However, because the first, second connecting balls 91, 92 have already been attached when the third connecting ball 93 is attached, it is possible that the third connecting ball 93 is attached with gentle power. Therefore, mechanical stress is able to be further lowered.

Further, the third connecting ball 93, which is jetted after the first, second connecting balls 91, 92, is attached to the first, second connecting balls 91, 92 though, because they all are formed with solder, they all are formed with same material. Therefore, surface tensions of the first, second, third connecting balls 91, 92, 93 balance each other out. Accordingly, mechanical stress dose not remain in the connecting points between the first, second connecting balls 91, 92 and the third connecting ball 93. Further, the solder connector forming step is performed, thereby the solder connector 199 is formed. As illustrated in FIG. 14, in the condition which the first, second, third connecting balls 91, 92, 93 are attached each other, because contacting parts of the first, second, third connecting balls 91, 92, 93 are small, the stability of the connection is poor. To the contrary, when the solder connector 199 is formed, contacting parts of the first, second, third connecting balls 91, 92, 93 become large, thereby, the stability of the connection condition is improved.

Accordingly, it is possible that the stability of the connection condition is improved in the HGA 101, which is manufactured in accordance with the method of manufacturing according to the first embodiment of the present invention.

Further, in the above-described method of manufacturing, the first connecting ball 91 is arranged so that the above-described first attaching condition is satisfied, in the first arrangement step. Thereby, as illustrated in FIG. 14, the distance, between the first connecting ball 91 and the flexure 106 (wiring member 75) is secured in a moderate size. Therefore, the "3-ball method", which the first, second, third connecting balls 91, 92, 93 are used, is surely realized. If the first arrangement distance D91 is smaller than the particle size of the second connecting ball 92 (R92), the second connecting ball 92 is likely to touch the first connecting ball 91, when the second connecting ball 92 is arranged. Therefore, the "3-ball method" is not likely to be realized. Accordingly, the first connecting ball 91 is arranged so that the above-described first attaching condition is satisfied, in the first arrangement step.

Further, the second connecting ball 92 is arranged so that the above-described second attaching condition is satisfied, in the second arrangement step. Thereby, because the distance, between the second connecting ball 92 and the n-electrode 14, is secured in a moderate size, it is possible that the "3-ball method" is surely realized.

Second Embodiment (Structure of a Head Gimbal Assembly)

Figure 15:
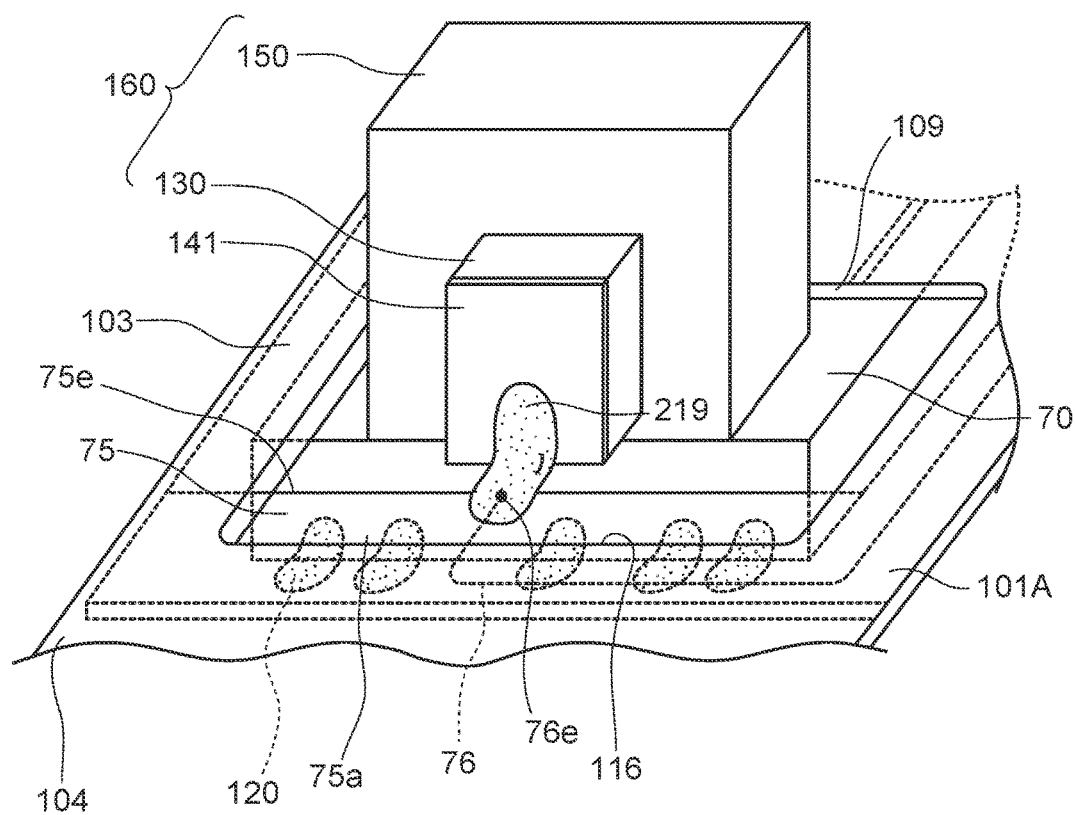
FIG. 15 is a perspective view, similar with FIG. 6, showing the principal part of the HGA which is manufactured by the method of manufacturing according to a second embodiment of the present invention.
Figure 16:
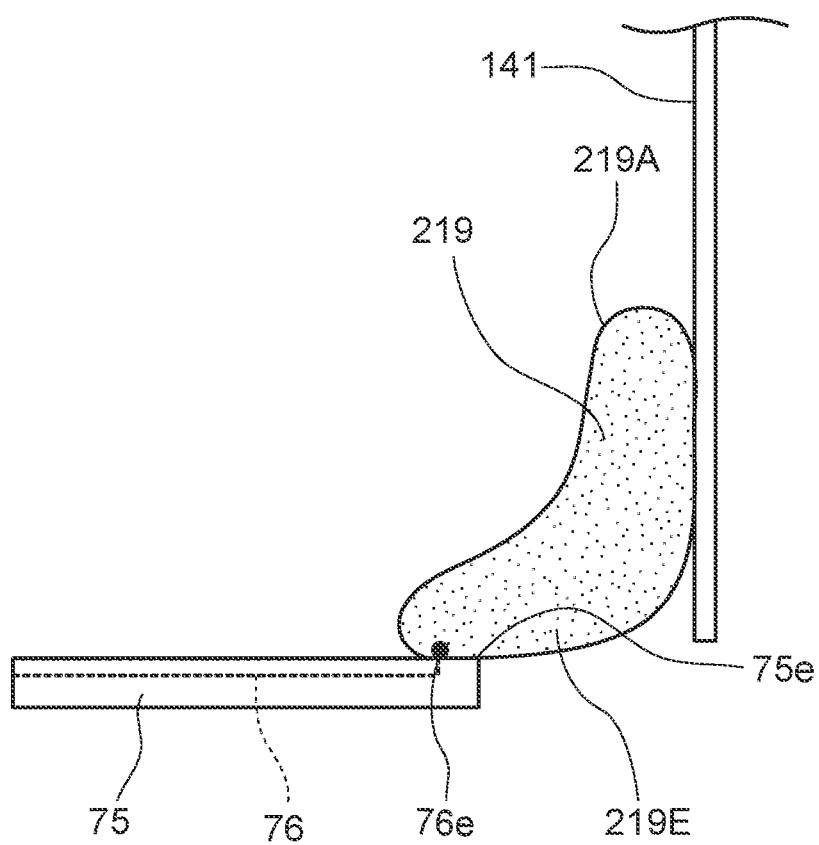
FIG. 16 is a side view showing the solder connecter which is included in the HGA in FIG. 15 and peripheral members.
Figure 17:
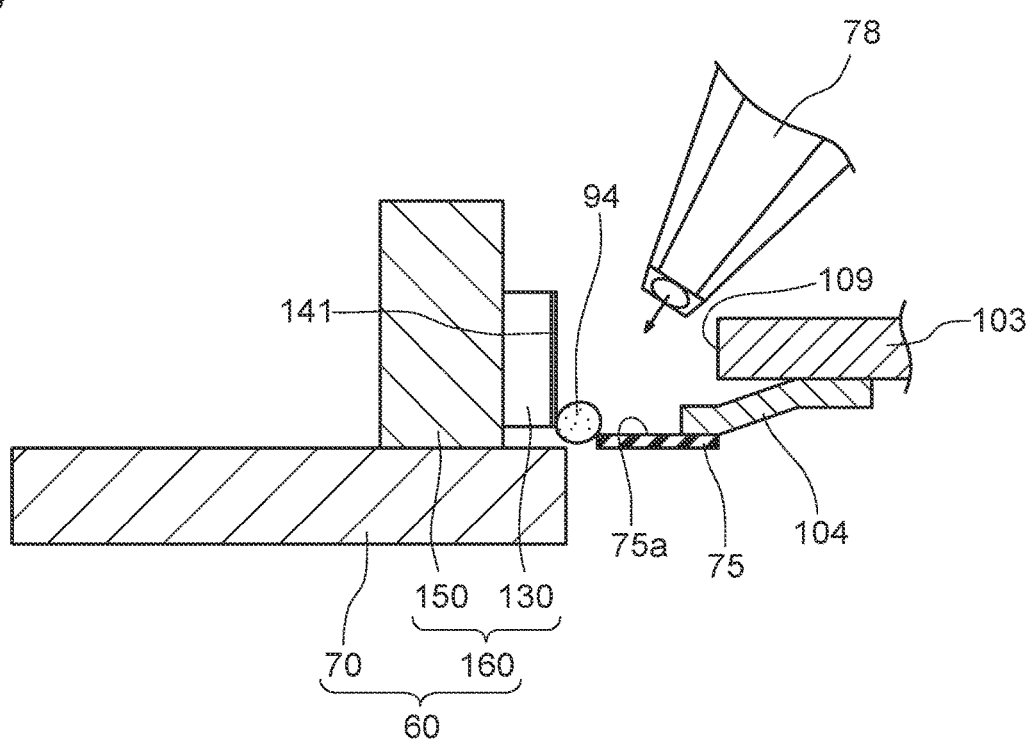
FIG. 17 is a sectional view showing the solder ball arrangement step of the method of manufacturing according to the second embodiment of the present invention.
Figure 18:
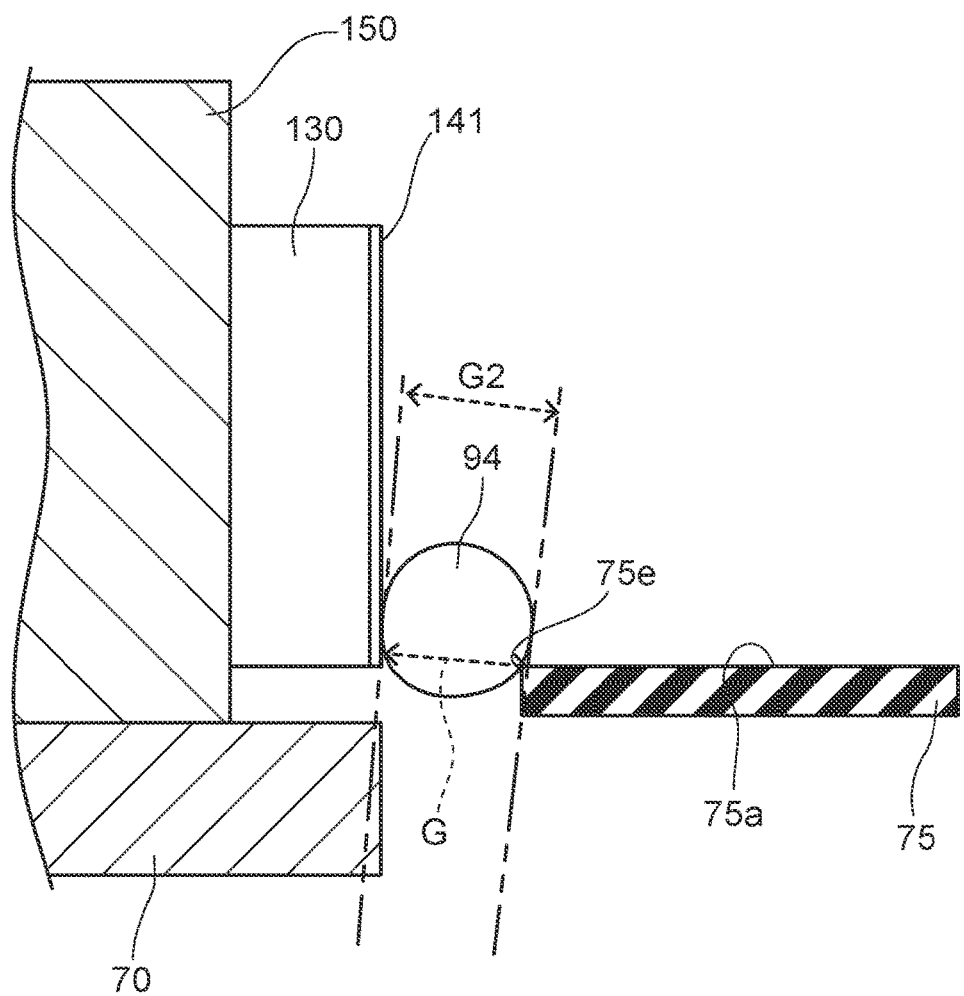
FIG. 18 is a sectional view showing a principal part when the solder ball arrangement step, of the method of manufacturing according to the second embodiment of the present invention, is performed.
Figure 19:
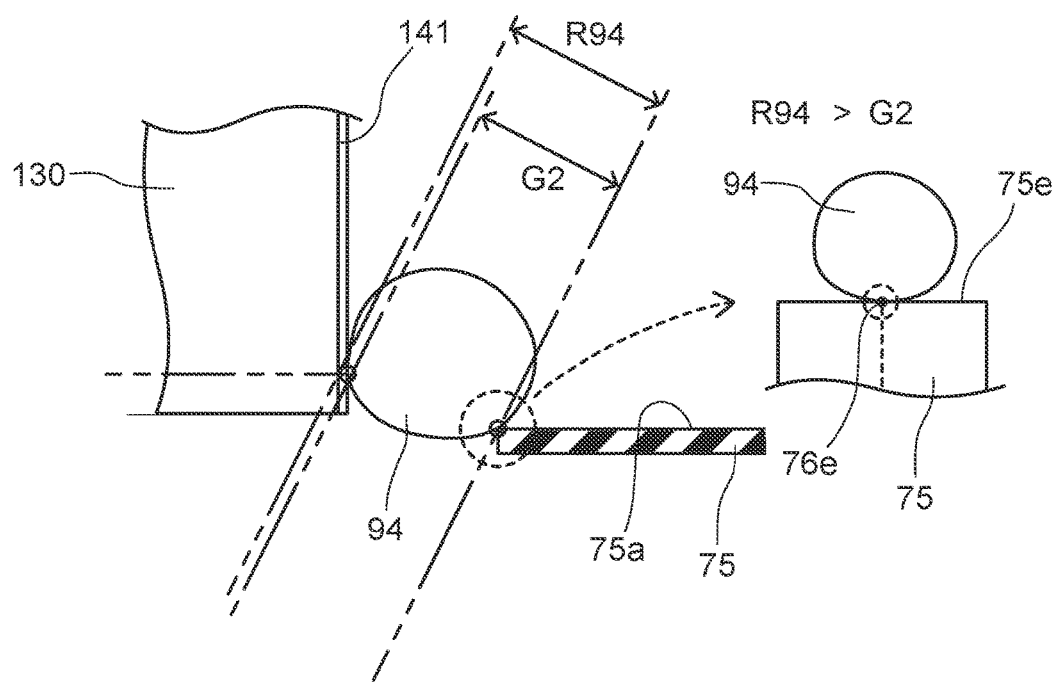
FIG. 19 is a sectional view, with enlargement, of the principal part of FIG. 18.

Next, structure of a Head Gimbal Assembly 101A which is manufactured with the method of manufacturing according to a second embodiment of the present invention will be explained with reference to FIG. 15 to FIG. 19. Here, FIG. 15 is a perspective view, similar with FIG. 6, showing the principal part of the HGA 101A. Further, FIG. 16 is a side view showing a solder connecter 219 which is included in the HGA 101A and peripheral members, FIG. 17 is a sectional view showing the solder ball arrangement step of the method of manufacturing according to the second embodiment of the present invention. FIG. 18 is a sectional view showing a principal part when the solder ball arrangement step of the method of manufacturing according to the second embodiment of the present invention is performed, FIG. 19 is a sectional view, with enlargement, of a principal part of FIG. 18.

The HGA 101A is different in that it has the solder connector 219 instead of the solder connector 199, as compared with the HGA 101.

As illustrated in FIG. 15, FIG. 16, the solder connector 219 is connected both the n-electrode 141 of the laser diode 130 and the connecting pad 76e of the electrode wiring 76, similar with the solder connector 199.

The solder connector 219 includes a slant part 219A and an extending part 210E. The slant part 219A is an outside surface of the solder connector 219, and it is formed in slanting shape from the surface of the n-electrode 141 to the wiring member 75. The slant part 219A does not have the neck part, different from the slant part 199A. Therefore, the slant part 219A does not have the neck structure.

The extending part 210E is a part which extends from a wiring end part 75e of the wiring member 75. The wiring end part 75e is a part, of the wiring member 75, which is closest to n-electrode 141, it is corresponding to a corner part, of the wiring member 75, arranged on the side of the n-electrode 141.

Because the HGA 101A is manufactured in accordance with the method of manufacturing according to the second embodiment of the present invention, the solder connector 219 includes the above-described structure (especially, wiring end part 75e).

Subsequently, the method of manufacturing the HGA 101A, will be explained as following. In the method of manufacturing according to the first embodiment of the present invention, the arrangement steps are performed three times (first, second, third arrangement steps) in the solder ball arrangement step, the first, second, third connecting balls 91, 92, 93 are arranged.

To the contrary, in the method of manufacturing according to the second embodiment of the present invention, the arrangement step is performed only one time in the solder ball arrangement step, only one fourth connecting ball 94 is arranged.

The fourth connecting ball 94 corresponds to the first, second, third connecting balls 91, 92, 93 in that they are in melted-particle condition, but the fourth connecting ball 94 is different to the first, second, third connecting balls 91, 92, 93 in its sizes. The fourth connecting ball 94 has the size which is smaller than the sizes of the first, second, third connecting balls 91, 92, 93 and is slightly larger than a later-described wiring gap G2.

As illustrated in FIG. 19, the wiring gap G2 is the distance between the n-electrode 141 and the wiring end part 75e of the wiring member 75. When the particle size of the fourth connecting ball 94 is R94, the R94 is slightly larger than the wiring gap G2 (R94>G2).

Because only one connecting ball 94 is used, in the method of manufacturing according to second embodiment, the method of manufacturing according to the second embodiment is also called "1-ball method".

Then, as illustrated in FIG. 17, FIG. 18, the fourth connecting ball 94 is jetted from the capillary 78, and the fourth connecting ball 94 is arranged in a gap G between the n-electrode 141 and the wiring end part 75e.

Because the fourth connecting ball 94 has the size which is slightly larger than the wiring gap G2, the fourth connecting ball 94 is caught on the gap G between the n-electrode 141 and the wiring end part 75e. Moreover, because the fourth connecting ball 94 is in melted-particle condition, it is attached to both the n-electrode 141 and wiring end part 75e.

After that, the fourth connecting ball 94 hardens though, the fourth connecting ball 94 hangs down downward (toward the side lower than the exposed wiring surface 75a) because of the weight, until the fourth connecting ball 94 harden. Then, a part of the fourth connecting ball 94 remains in the side upper than the exposed wiring surface 75a, and a part of the fourth connecting ball 94, being outside than the wiring end part 75e, also remains in an extending form. As the result, the solder connector 219, having the above-described form, is formed.

In the HGA101A, the solder connector 219 connects the n-electrode 141 and the wiring member 75 though, the solder connector 219 is manufactured with the fourth connecting ball 94. When the fourth connecting ball 94 is arranged, the fourth connecting ball 94 is attached to both the n-electrode 141 and wiring member 75 at a time.

However, as illustrated in FIG. 19, attaching points, of the fourth connecting ball 94, which are extremely narrow are attached only in both the n-electrode 141 and the exposed wiring surface 75a, the contacting parts of the fourth connecting ball 94 are limited to the minimum necessary size. On this point, when the size of the fourth connecting ball 94 too large, attaching parts, of the fourth connecting ball 94 to the respective n-electrode 141 and the exposed wiring surface 75a, are enlarged, it is not preferable. Therefore, size of the fourth connecting ball 94 is set in the size which is slightly larger than the wiring gap G2. Thereby, because the fourth connecting ball 94 is attached to the respective n-electrode 141, the exposed wiring surface 75a in the extremely narrow area, even if the fourth connecting ball 94 has surface extension, the rages, being affected by surface tension of the fourth connecting ball 94, are limited to the extremely narrow area. Therefore, mechanical stress is extremely lowered. Accordingly, it is possible that the stability of the connection condition is improved in the HGA 101A.

Third Embodiment (Structure of the Head Gimbal Assembly)

Figure 20:
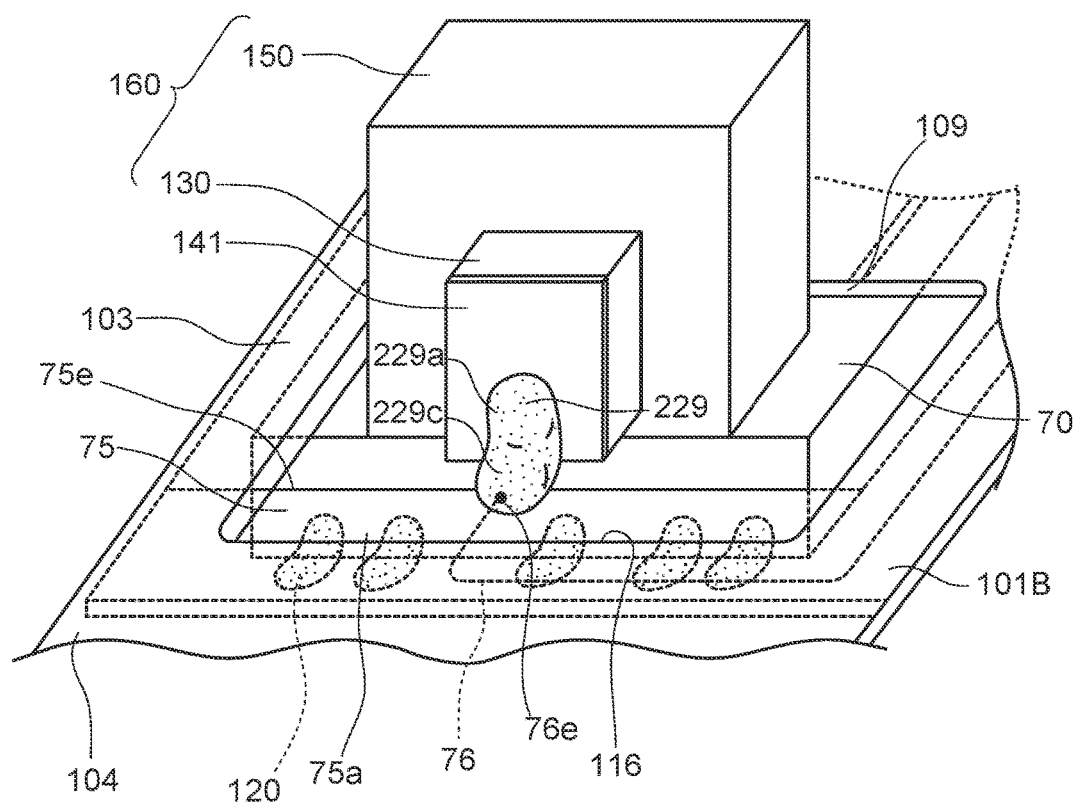
FIG. 20 is a perspective view, similar with FIG. 6, of the HGA which is manufactured by the method of manufacturing according to a third embodiment of the present invention.
Figure 21:
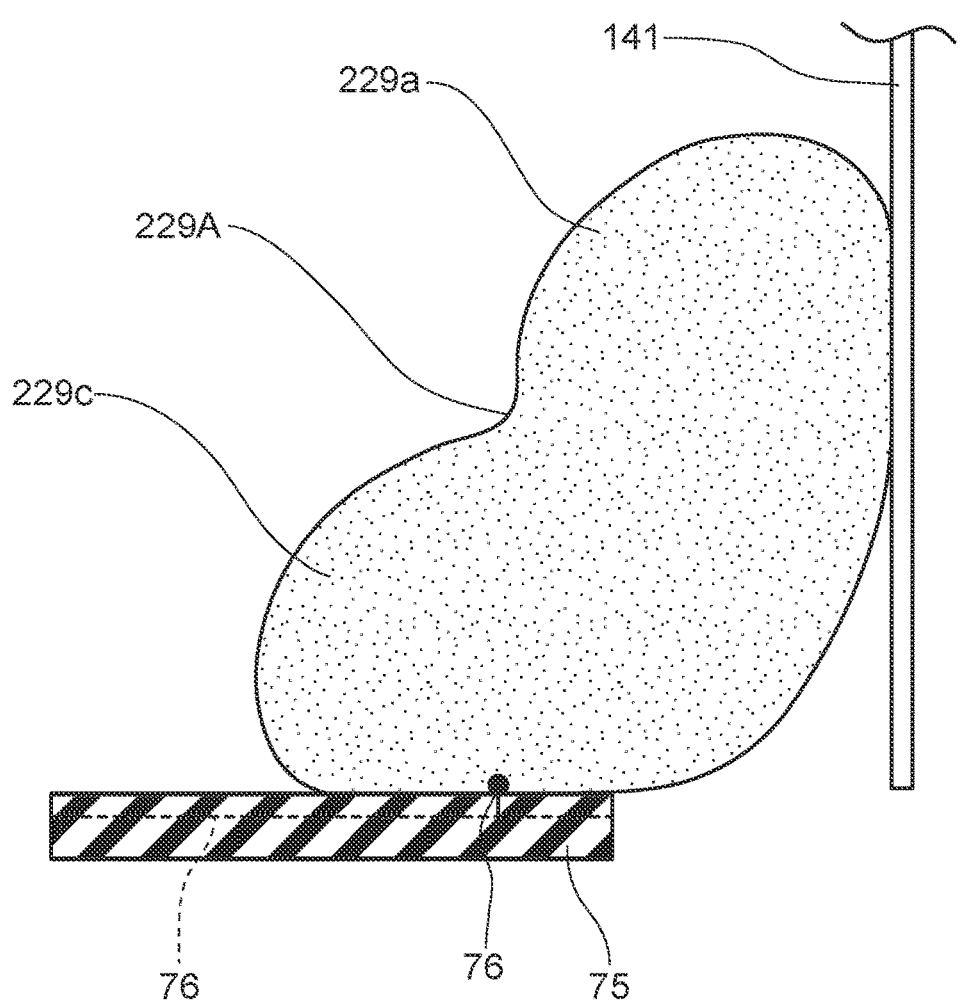
FIG. 21 is a side view showing the solder connecter which is included in the HGA in FIG. 20 and peripheral members.
Figure 22:
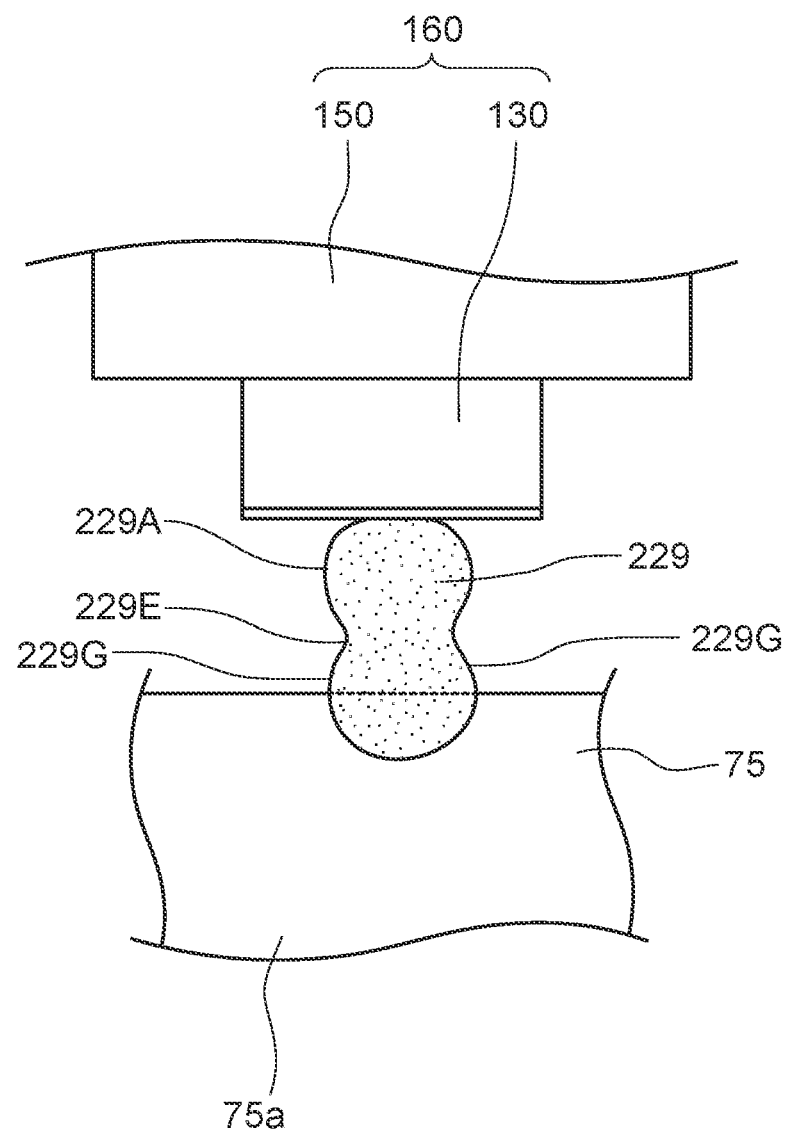
FIG. 22 is a plan view showing the solder connecter which is included in the HGA in FIG. 20 and peripheral members.
Figure 23:
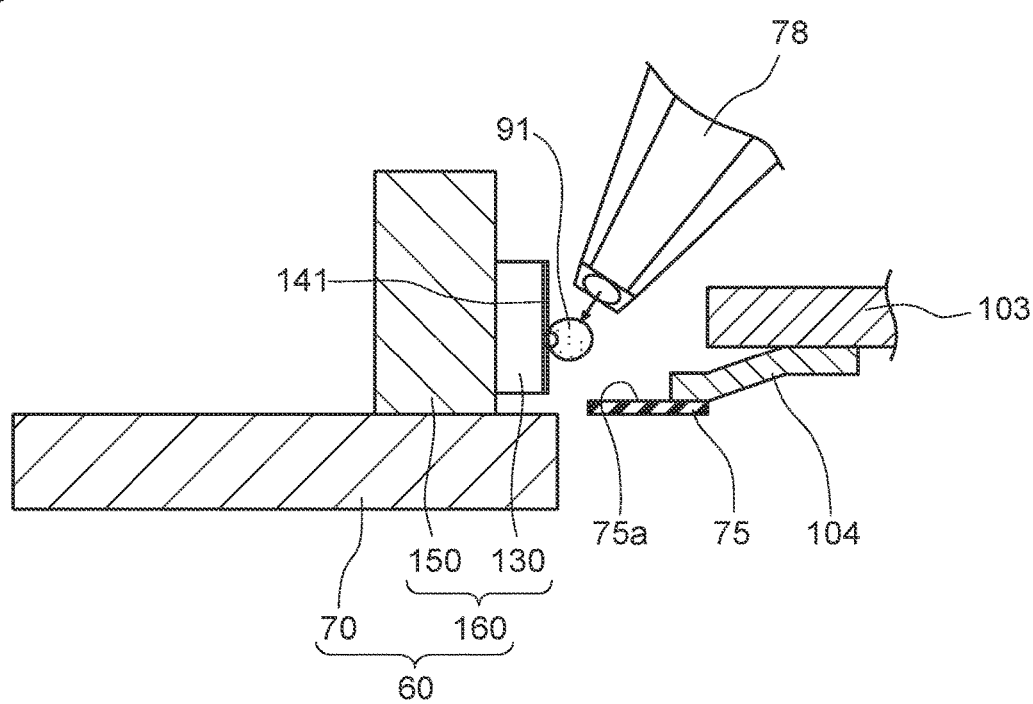
FIG. 23 is a sectional view showing the solder ball arrangement step of the method of manufacturing according to the third embodiment of the present invention.
Figure 24:
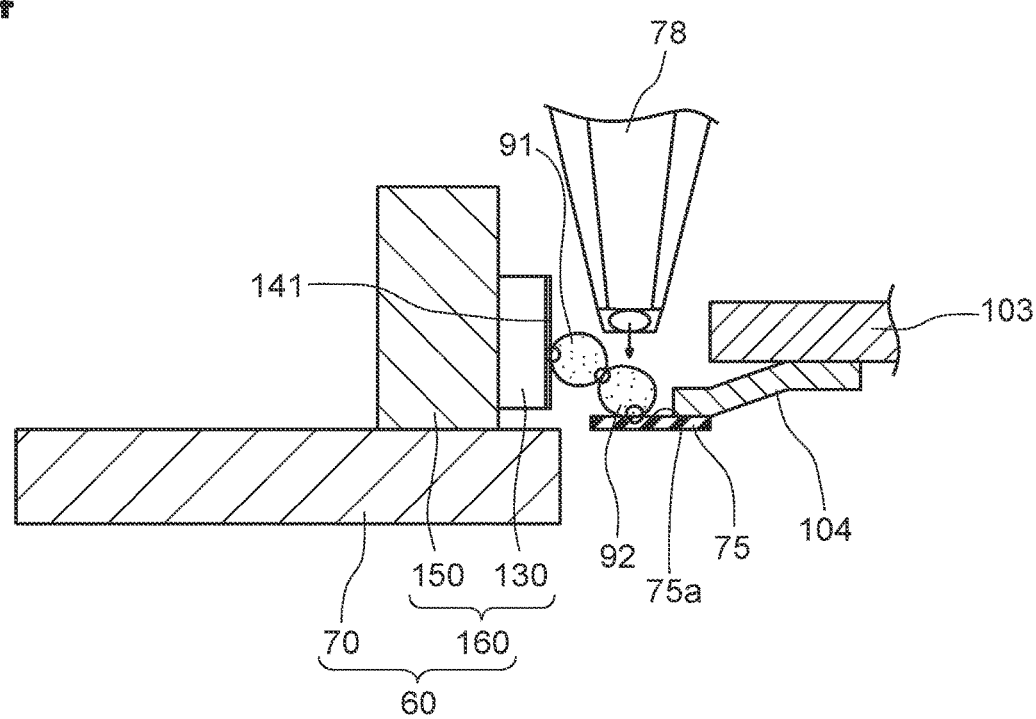
FIG. 24 is a sectional view showing a step subsequent to that in FIG. 23.

Next, the structure of the Head Gimbal Assembly 101B, which is manufactured with the method of manufacturing according to the third embodiment of the present invention, will be explained with reference to FIG. 20 to FIG. 25. Here, FIG. 20 is a perspective view, similar with FIG. 6, showing the principal part of the HGA 101B. Further, FIG. 21 is a side view showing a solder connecter 229 which is included in the HGA 101B and peripheral members, FIG. 22 is a plan view showing the solder connecter 229 which is included in the HGA 101B and peripheral members. FIG. 23 to FIG. 24 are sectional views, corresponding to FIG. 9, FIG. 10, showing the solder ball arrangement step of the method of manufacturing according to the third embodiment of the present invention.

The HGA 101B is different in that it has the solder connector 229 instead of the solder connector 199, as compared with the HGA 101.

As illustrated in FIG. 21, the solder connector 229 is connected to both the n-electrode 141 of the laser diode 130 and the connecting pad 76e of the electrode wiring 76, similar with the solder connector 199. Further, the solder connector 229 has the neck structure, similar with the above-described solder connector 199.

The above-described solder connector 199 has the neck structure though, the neck structure is the double-neck structure including the two neck parts 199E, 199F.

The solder connector 229 has the neck structure. However, as illustrated in FIG. 22, the neck structure of the solder connector 229 is a single-neck structure, including a neck part 229E. The neck part 229E is formed on the lant part 229A.

The slant part 229A is an outside surface of the solder connector 229, and it is formed in slanting shape from the surface of the n-electrode 141 to the wiring member 75. The one neck part 229E is formed in the slant part 229A.

The neck part 229E is a part which the widths, along with the direction intersecting the length direction (direction from the surface of the n-electrode 141 to the wiring member 75 along with the slant part 229A) are gradually narrowed. As illustrated in FIG. 20, FIG. 22, there are two edge lines 229G in both sides of the slant part 229A, the respective edge lines 229G include two circular arc parts. The parts, which the respective circular arc parts are connected, corresponds to the neck-part 229E.

Further, as illustrated in FIG. 21, the solder connector 229 includes two parts of an upper part 229a, a lower part 229c, which are connected at the neck-part 229E.

Then, because the HGA 101B is manufactured in accordance with the method of manufacturing according to the third embodiment of the present invention, the solder connector 229 includes the single-neck structure.

Subsequently, the method of manufacturing the HGA 101B (the method of manufacturing according to the third embodiment) will be explained as following. The above-described method of manufacturing HGA 101 (the method of manufacturing according to the first embodiment) is the "3-ball method", the arrangement steps are performed three times, thereby the first, second, third connecting balls 91, 92, 93 are arranged.

To the contrary, in the method of manufacturing HGA 101B, the arrangement steps are performed two times in the solder ball arrangement step, the first, second connecting balls 91, 92 are arranged. In the method of manufacturing according to the third embodiment, two connecting balls 91, 92 are used, the method of manufacturing according to the third embodiment is also called "2-ball method".

Figure 25:
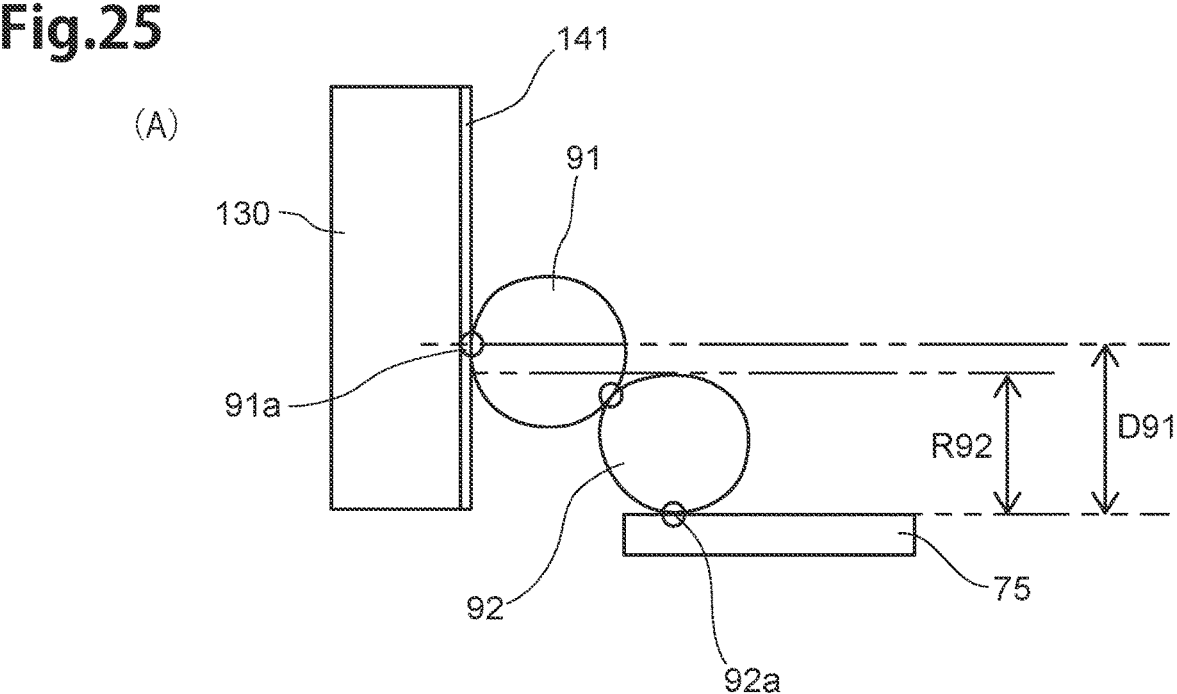
FIG. 25(A) is a perspective view showing a principal part, after solder ball arrangement step, of the method of manufacturing according to the third embodiment of the present invention, is performed.
FIG. 25(B) is a sectional view showing the case which the connecting balls are arranged in the different positions from those of in (A)
Figure 25:
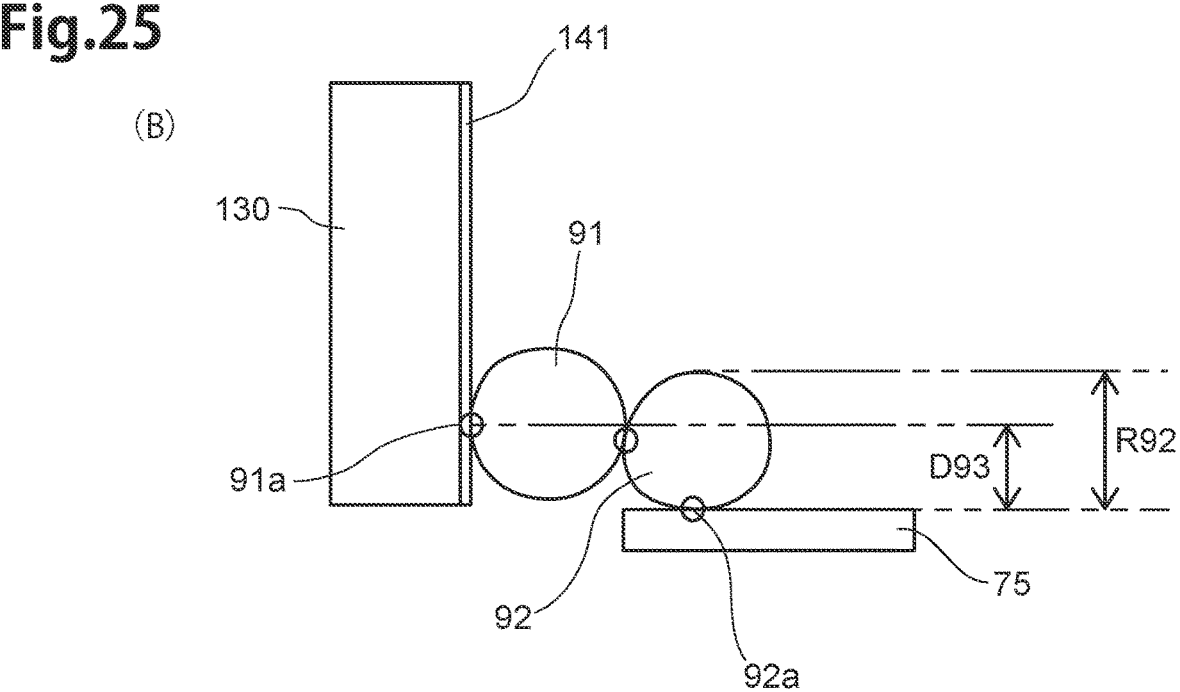

Subsequently, the solder ball arrangement step is explained in detail, with reference to FIGS. 23, 24, 25. In case of the method of manufacturing according to the third embodiment, the first arrangement step is performed, in the solder ball arrangement step, similar with the method of manufacturing according to the first embodiment.

As illustrated in FIG. 23, the first connecting ball 91 is jetted from the capillary 78, and the first connecting ball 91 is attached to the n-electrode 141. However, the first connecting ball 91 is attached to the position different from the case of "3-ball method". The first connecting ball 91, in this case, is arranged so that the following third attaching condition is satisfied.

Third attaching condition: as illustrated in FIG. 25(A), the first connecting ball 91 is attached to the n-electrode 141 so that the first connecting ball 91 is away from the flexure 106 (wiring member 75) in a first arrangement distance D91, and the part of the first connecting ball 91 is closer to the flexure 106 (wiring member 75) than the particle size of the second connecting ball 92 (R92).

However, the first arrangement distance D91 is larger than the particle size of the second connecting ball 92 (R92) (D91>R92).

Next, the second arrangement step is performed. As illustrated in FIG. 24, in the second arrangement step, the second connecting ball 92 is jetted from the capillary 78, and the second connecting ball 92 is attached to the exposed wiring surface 75a of the wiring member 75. However, the second connecting ball 92 is attached to the position different from the case of "3-ball method".

In this case, because the first connecting ball 91 is arranged so that the above-described third attaching condition is satisfied, the distance between the first connecting ball 91 and the exposed wiring surface 75a is narrower than the particle size of the second connecting ball 92 (R92). Therefore, the second connecting ball 92 is arranged so as to be attached to both the first connecting ball 91 and the flexure 106 (wiring member 75).

Further, in the above-described method of manufacturing, after the first, second arrangement steps are performed, the solder connector forming step is performed. In the solder connector forming step, one neck part (neck parts 229E) is formed.

The first, second connecting balls 91, 92 are in melted-particle condition. Therefore, as illustrated in FIG. 25(A), the first connecting ball 91 and the second connecting ball 92 are attached to form a solder member, united into one body, after that, they merge together. Further, when the first, second connecting balls 91, 92 harden, a formation of the solder member is fixed. However, the first, second connecting balls 91, 92 hang down downward (toward the exposed wiring surface 75*a*), because of their weight, until the first, second connecting balls 91, 92 harden. As a result, the solder connector 229, having the above-described form, is formed.

In this way, the first, second connecting balls 91, 92 are united into one body, after that, the first, second connecting balls 91, 92 harden, thereby the solder connector 229 is formed. Thereby, the solder connector 229 has the above-described single neck structure.

In the first arrangement steps, because the first connecting ball 91 is arranged so that the first connecting ball 91 is attached only in the n-electrode 141, attaching point 91*a*, of the first connecting ball 91 which are extremely narrow, are attached only in the n-electrode 141. Therefore, the range, being affected by surface tension of the first connecting ball 91, is limited to the extremely narrow area, it is possible that the stability of the connection condition is improved in the HGA 101B.

The second connecting ball 92 is attached to both the first connecting ball 91 and the wiring member 75. The second connecting ball 92 is attached to both the first connecting ball 91 and the wiring member 75 at a time though, because the part, of the second connecting ball 92, which is attached to the wiring member 75, is limited to the narrow attaching point 92*a*, the rages, being affected by surface tension of the second connecting ball 92, are limited to the extremely narrow area. Further, the second connecting ball 92 is in contact with the first connecting ball 91 though, because both surface tension balance each other out, mechanical stress dose not remain in the connecting point between the second connecting ball 92 and the first connecting ball 91. Therefore, concerning the HGA 101B, because mechanical stress is also extremely lowered, it is possible that the stability of the connection condition is improved in the HGA 101B.

(Modified Example)

As illustrated in FIG. 25(B), it is possible that the first connecting ball 91 is arranged in the position closer than the particle size of the second connecting ball 92 (R92), in the first arrangement step. Even in this case, the second connecting ball 92 is arranged so that the second connecting ball 92 is attached to both the first connecting ball 91 and the flexure 106 (wiring member 75), in the second arrangement step.

Further, in case of the method of manufacturing according to the first embodiment and the method of manufacturing according to the third embodiment, the first, second connecting balls 91, 92 are respectably attached to the n-electrode 141, the exposed wiring surface 75*a*, in the first arrangement step, second arrangement step. Namely, the first, second connecting balls 91, 92 are attached to the n-electrode 141, the exposed wiring surface 75*a*, in the order of the n-electrode 141, the exposed wiring surface 75*a*. To the contrary, it is possible that the first, second connecting balls 91, 92 are attached to the exposed wiring surface 75*a*, the n-electrode 141, in the order of the exposed wiring surface 75*a*, the n-electrode 141. It is possible that the connecting ball is attached to only either one of the n-electrode 141 and the exposed wiring surface 75*a* in the first arrangement step, the connecting ball is attached to only the other of the n-electrode 141 and the exposed wiring surface 75*a* in the second arrangement step.

(Embodiments of Hard Disk Drive)

Next, embodiments of the hard disk drive will be explained with reference to FIG. 26.

Figure 26:
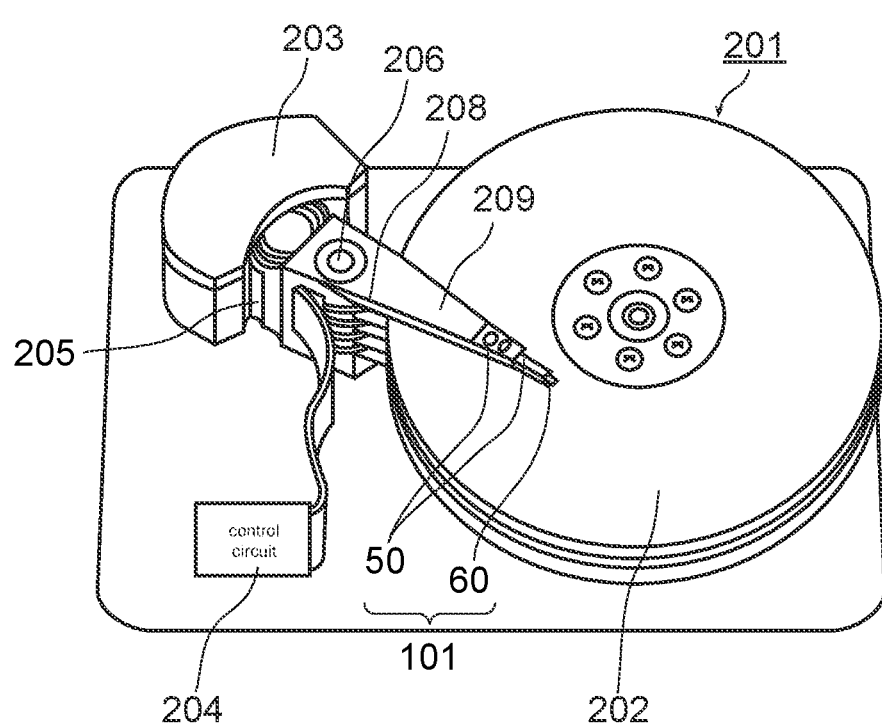
FIG. 26 is a perspective view showing a hard disk drive including the HGA in FIG. 1.
Figure 27:
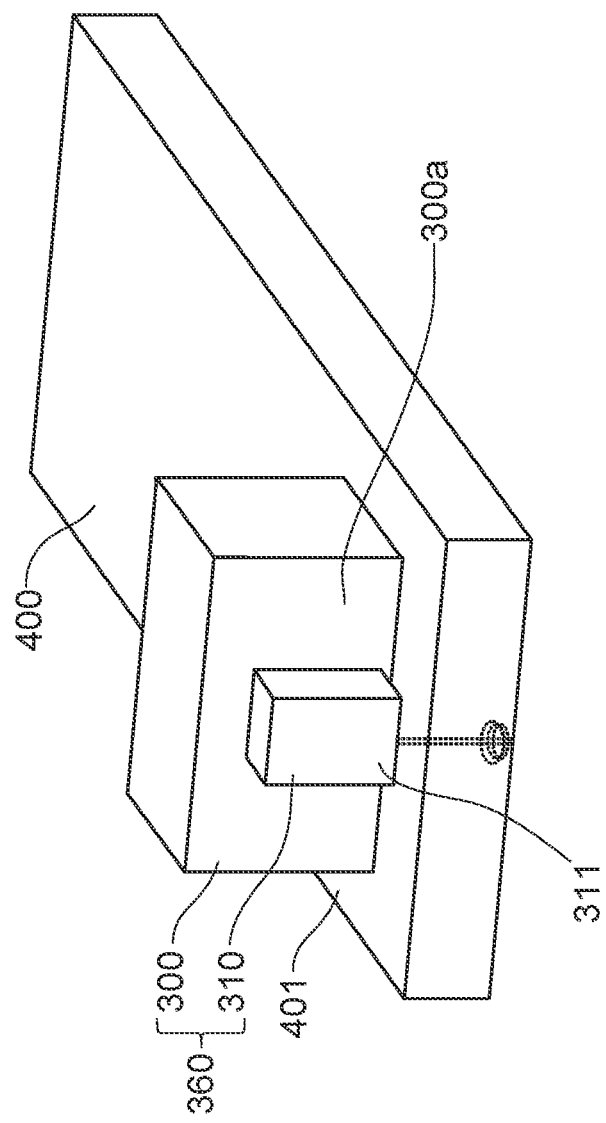
FIG. 27 is a perspective view showing a conventional thermally assisted magnetic head.
Figure 28:
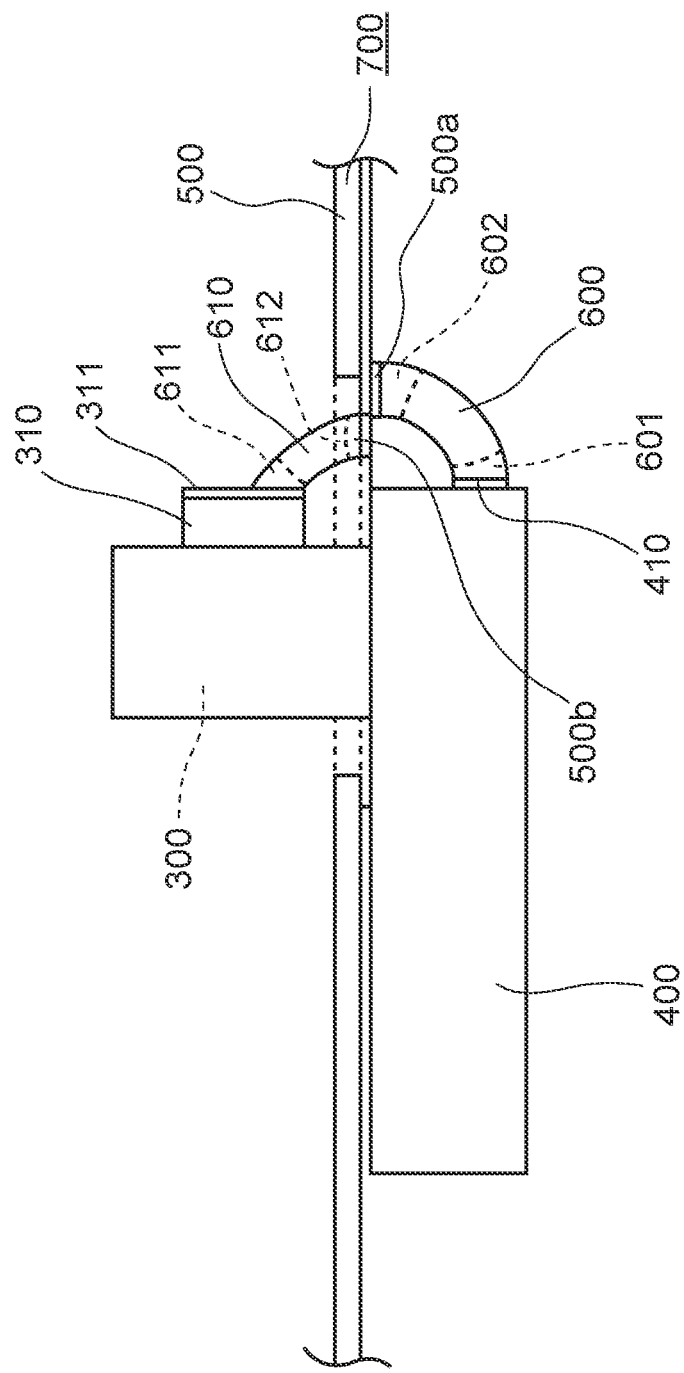
FIG. 28 is a side view, partly omitted, illustrating a principal part of the conventional HGA.

FIG. 26 is a perspective view showing a hard disk drive 201 equipped with the HGA 101 having the above-described thermally assisted magnetic head 60. The hard disk drive 201 includes a hard disk (magnetic recording medium) 202, rotating at a high speed, and the above-described head gimbal assembly (HGA) 101. The hard disk drive 201 is an apparatus which actuates the HGA 101, so as to record/reproduce data onto/from recording surfaces of the hard disk 202. The hard disk 202 has a plurality of (4 in the drawing) platters. Each platter has a recording surface opposing its corresponding the thermally assisted magnetic head 60.

The hard disk drive 201 positions the slider 70 on a track by an assembly carriage device 203. Further, the hard disk drive 201 has a plurality of drive arms 209. The drive arms 209 pivot about a pivot bearing shaft 206 by means of a voice coil motor (VCM) 205, and are stacked in a direction along the pivot bearing shaft 206. Further, the HGA 101 is attached to the tip of each drive arm 209.

Further, the hard disk drive 201 has a control circuit 204 controlling recording/reproducing and the generation of light by the laser diode 130.

In the hard disk drive 201, when the HGA 101 is rotated, the thermally assisted magnetic head 60 moves in a radial direction of the hard disk 202, i.e., a direction traversing track lines.

The hard disk drive 201 have the HGA 101, thereby mechanical stress, caused by the connection with solder, is extremely lowered. Accordingly, concerning the hard disk drive 201, it is possible that the stability of the connection condition is improved in the HGA 101.

Though the above-mentioned embodiments explain a type in which a thin-film coil is wound like a flat spiral about the recording magnetic layer by way of example, the present invention is also applicable to a type in which the thin-film coil is wound helically about the recording magnetic layer.

This invention is not limited to the foregoing embodiments but various changes and modifications of its components may be made without departing from the scope of the present invention. Besides, it is clear that various embodiments and modified examples of the present invention can be carried out on the basis of the foregoing explanation. Therefore, the present invention can be carried out in modes other than the above-mentioned best modes within the scope equivalent to the following claims.

What is claimed is:

1. A method of manufacturing a head gimbal assembly having a thermally assisted magnetic head and a suspension comprising:
   a head connecting step which the thermally assisted magnetic head is connected to the suspension;
   wherein the thermally assisted magnetic head comprises a structure which a light-source unit, having a laser diode, is joined to a slider in which an electromagnetic element is formed;
   wherein the suspension comprises an opening part which penetrates from a slider arrangement surface, which the slider is arranged, to a light-source unit surface, which the light-source unit is arranged, and a flexure which forms the slider arrangement surface;

wherein the head connecting step comprises a solder ball arrangement step which a solder ball is arranged so that the laser diode is connected to the flexure, in an assembly structure which the light-source unit is inserted into the opening part from the slider arrangement surface of the suspension and the light-source unit is protruded from the light-source unit surface and the slider is adhered to the slider arrangement surface of the suspension;

wherein the solder ball arrangement step is performed using a connecting ball, as the solder ball, having a size smaller than a wiring gap between an electrode surface of the laser diode and the flexure, and being in melted-particle condition, so that the connecting ball is attached to the electrode surface of the laser diode or the flexure, by being jetted from a position which is distant from both of the electrode surface and the flexure, toward the electrode surface or the flexure.

2. The method of manufacturing a head gimbal assembly according to claim 1, wherein the solder ball arrangement step comprises a first arrangement step and a second arrangement step;

wherein the first arrangement step is performed so that the connecting ball is attached to only either one of the electrode surface of the laser diode and the flexure, by being jetted from a position which is distant from both of the electrode surface and the flexure, toward the electrode surface or the flexure;

wherein the second arrangement step is performed so that the connecting ball is attached to only the other of the electrode surface of the laser diode and the flexure, by being jetted from the position which is distant from both of the electrode surface and the flexure, toward the electrode surface or the flexure.

3. The method of manufacturing a head gimbal assembly according to claim 2, wherein the solder ball arrangement step is performed so that the connecting ball is away from the flexure in a first arrangement distance larger than the particle size of the connecting ball, when the connecting ball is arranged so as to be attached to the electrode surface in either one of the first arrangement step and the second arrangement step.

4. The method of manufacturing a head gimbal assembly according to claim 2, wherein the solder ball arrangement step is performed so that the connecting ball is away from the electrode surface in a second arrangement distance larger than the particle size of the connecting ball, when the connecting ball is arranged so as to be attached to the flexure in either one of the first arrangement step and the second arrangement step.

5. The method of manufacturing a head gimbal assembly according to claim 2, further comprising:

a solder connector forming step which the first connecting ball and the second connecting ball merge together to form a solder connector after the solder ball arrangement step is performed;

wherein the solder connector forming step is performed so that the solder connector includes a neck part.

6. The method of manufacturing a head gimbal assembly according to claim 2, wherein the suspension comprises a load beam which forms the light-source unit surface:

wherein the flexure comprises a wiring member which forms the slider arrangement surface;

wherein the wiring member comprises an exposed wiring surface which is exposed in the opening part;

wherein the solder ball arrangement step is performed so that the connecting ball is attached to the exposed wiring surface, in the first arrangement step or the second arrangement step.

7. A method of manufacturing a head gimbal assembly having a thermally assisted magnetic head and a suspension comprising:

a head connecting step which the thermally assisted magnetic head is connected to the suspension;

wherein the thermally assisted magnetic head comprises a structure which a light-source unit, having a laser diode, is joined to a slider in which an electromagnetic element is formed;

wherein the suspension comprises an opening part which penetrates from a slider arrangement surface, which the slider is arranged, to a light-source unit surface, which the light-source unit is arranged, and a flexure which forms the slider arrangement surface;

wherein the head connecting step comprises a solder ball arrangement step which a solder ball is arranged so that the laser diode is connected to the flexure, in an assembly structure which the light-source unit is inserted into the opening part from the slider arrangement surface of the suspension and the light-source unit is protruded from the light-source unit surface and the slider is adhered to the slider arrangement surface of the suspension;

wherein the solder ball arrangement step is performed using a connecting ball, as the solder ball, having a size smaller than a wiring gap between an electrode surface of the laser diode and the flexure, and being in melted-particle condition;

wherein the solder ball arrangement step comprises a first arrangement step and a second arrangement step;

wherein the first arrangement step is performed so that the connecting ball is attached to only either one of the electrode surface of the laser diode and the flexure;

wherein the second arrangement step is performed so that the connecting ball is attached to only the other of the electrode surface of the laser diode and the flexure, wherein, the solder ball arrangement step further comprises a third arrangement step which a third connecting ball is arranged;

wherein the third connecting ball is different from a first connecting ball, arranged in the first arrangement step and a second connecting ball, arranged in the second arrangement step;

wherein the third connecting ball is performed so that the third connecting ball is attached to both the first connecting ball and the second connecting ball.

8. The method of manufacturing a head gimbal assembly according to claim 7, further comprising:

a solder connector forming step which the first connecting ball, the second connecting ball and the third connecting ball merge together to form a solder connector after the solder ball arrangement step is performed;

wherein the solder connector forming step is performed so that the solder connector includes two neck parts.

* * * * *